(12) United States Patent
Venetianer et al.

(10) Patent No.: US 7,868,912 B2
(45) Date of Patent: Jan. 11, 2011

(54) VIDEO SURVEILLANCE SYSTEM EMPLOYING VIDEO PRIMITIVES

(75) Inventors: Peter L. Venetianer, McLean, VA (US);
Alan J. Lipton, Herndon, VA (US);
Andrew J. Chosak, Arlington, VA (US);
Matthew F. Frazier, Arlington, VA (US); Niels Haering, Reston, VA (US);
Gary W. Myers, Ashburn, VA (US);
Weihong Yin, Herndon, VA (US);
Zhong Zhang, Herndon, VA (US)

(73) Assignee: ObjectVideo, Inc., Reston, VA (US)

( * ) Notice: Subject to any disclaimer, the term of this patent is extended or adjusted under 35 U.S.C. 154(b) by 1612 days.

(21) Appl. No.: 11/098,385

(22) Filed: Apr. 5, 2005

(65) Prior Publication Data

US 2005/0169367 A1 Aug. 4, 2005

Related U.S. Application Data

(63) Continuation-in-part of application No. 11/057,154, filed on Feb. 15, 2005, which is a continuation-in-part of application No. 09/987,707, filed on Nov. 15, 2001, now abandoned, which is a continuation-in-part of application No. 09/694,712, filed on Oct. 24, 2000, now Pat. No. 6,954,498.

(51) Int. Cl.
*H04N 7/18* (2006.01)

(52) U.S. Cl. .................................................. 348/143

(58) Field of Classification Search ................. 348/143, 348/148, 150, 149, 166, 169, 170; 382/103, 382/115; 375/240.02, 240.08; *H04N 7/18*
See application file for complete search history.

(56) References Cited

U.S. PATENT DOCUMENTS

| 3,812,287 | A | 5/1974 | Lemelson |
| 4,249,207 | A | 2/1981 | Harman et al. |
| 4,257,063 | A | 3/1981 | Loughry et al. |
| 4,737,847 | A | 4/1988 | Araki et al. |
| 4,908,704 | A | 3/1990 | Fujioka et al. |
| 5,448,315 | A | 9/1995 | Soohoo |
| 5,491,511 | A | 2/1996 | Odle |
| 5,515,453 | A | 5/1996 | Hennessey et al. |
| 5,610,653 | A | 3/1997 | Abecassis |
| 5,623,249 | A | 4/1997 | Camire |
| 5,696,503 | A | 12/1997 | Nasburg |

(Continued)

FOREIGN PATENT DOCUMENTS

EP 0293189 B1 7/1994

(Continued)

OTHER PUBLICATIONS

International Search Report for International Application No. PCT/US08/09073, dated Nov. 3, 2008.

(Continued)

*Primary Examiner*—Tung Vo
(74) *Attorney, Agent, or Firm*—Muir Patent Consulting, PLLC

(57) ABSTRACT

A video surveillance system extracts video primitives and extracts event occurrences from the video primitives using event discriminators. The system can undertake a response, such as an alarm, based on extracted event occurrences.

22 Claims, 19 Drawing Sheets

U.S. PATENT DOCUMENTS

| | | | |
|---|---|---|---|
| 5,801,943 A | 9/1998 | Nasburg | |
| 5,802,361 A | 9/1998 | Wang et al. | |
| 5,850,352 A * | 12/1998 | Moezzi et al. | 345/419 |
| 5,860,086 A | 1/1999 | Crump et al. | |
| 5,872,865 A | 2/1999 | Normile et al. | |
| 5,886,701 A | 3/1999 | Chauvin et al. | |
| 5,912,980 A * | 6/1999 | Hunke | 382/103 |
| 5,926,210 A | 7/1999 | Hackett et al. | |
| 5,956,081 A | 9/1999 | Katz et al. | |
| 5,959,690 A | 9/1999 | Toebes, VIII et al. | |
| 5,963,202 A | 10/1999 | Polish | |
| 5,963,203 A | 10/1999 | Goldberg et al. | |
| 5,983,147 A | 11/1999 | Krumm | |
| 5,987,211 A | 11/1999 | Abecassis | |
| 5,999,189 A | 12/1999 | Kajiya et al. | |
| 6,014,461 A | 1/2000 | Hennessey et al. | |
| 6,025,877 A * | 2/2000 | Chang et al. | 375/240.01 |
| 6,031,573 A | 2/2000 | MacCormack et al. | |
| 6,069,653 A | 5/2000 | Hudson et al. | |
| 6,075,560 A | 6/2000 | Katz | |
| 6,088,484 A | 7/2000 | Mead | |
| 6,091,771 A | 7/2000 | Seeley et al. | |
| 6,097,429 A * | 8/2000 | Seeley et al. | 348/154 |
| 6,123,123 A | 9/2000 | Carder et al. | |
| 6,144,375 A | 11/2000 | Jain et al. | |
| 6,151,413 A | 11/2000 | Jang | |
| 6,166,744 A | 12/2000 | Jaszlics et al. | |
| 6,177,886 B1 | 1/2001 | Billington et al. | |
| 6,201,473 B1 | 3/2001 | Schaffer | |
| 6,211,907 B1 | 4/2001 | Scaman et al. | |
| 6,226,388 B1 | 5/2001 | Qian et al. | |
| 6,297,844 B1 | 10/2001 | Schatz et al. | |
| 6,307,885 B1 | 10/2001 | Moon et al. | |
| 6,310,916 B1 | 10/2001 | Han | |
| 6,326,964 B1 | 12/2001 | Snyder et al. | |
| 6,351,265 B1 | 2/2002 | Bulman | |
| 6,351,492 B1 | 2/2002 | Kim | |
| 6,360,234 B2 * | 3/2002 | Jain et al. | 715/201 |
| 6,404,455 B1 | 6/2002 | Ito et al. | |
| 6,411,724 B1 | 6/2002 | Vaithilingam et al. | |
| 6,424,370 B1 | 7/2002 | Courtney | |
| 6,504,479 B1 | 1/2003 | Lemons et al. | |
| 6,525,658 B2 | 2/2003 | Streetman et al. | |
| 6,542,840 B2 | 4/2003 | Okamoto et al. | |
| 6,552,826 B2 | 4/2003 | Adler et al. | |
| 6,570,608 B1 | 5/2003 | Tsergn | |
| 6,573,907 B1 | 6/2003 | Madrane et al. | |
| 6,597,800 B1 | 7/2003 | Murray et al. | |
| 6,628,835 B1 | 9/2003 | Brill et al. | |
| 6,646,676 B1 | 11/2003 | DaGraca et al. | |
| 6,696,945 B1 | 2/2004 | Venetianer et al. | |
| 6,707,852 B1 | 3/2004 | Wang | |
| 6,721,454 B1 * | 4/2004 | Qian et al. | 382/224 |
| 6,724,915 B1 | 4/2004 | Toklu et al. | |
| 6,727,938 B1 | 4/2004 | Randall | |
| 6,738,424 B1 | 5/2004 | Allmen et al. | |
| 6,741,977 B1 | 5/2004 | Nagaya | |
| 6,801,662 B1 | 10/2004 | Owechko et al. | |
| 6,816,184 B1 | 11/2004 | Brill et al. | |
| 6,829,371 B1 | 12/2004 | Nichani et al. | |
| 6,844,818 B2 | 1/2005 | Grech-Cini | |
| 6,865,580 B1 | 3/2005 | Bush | |
| 6,924,801 B1 | 8/2005 | Dorbie | |
| 6,954,498 B1 | 10/2005 | Lipton | |
| 6,987,528 B1 | 1/2006 | Nagahisa et al. | |
| 6,987,883 B2 | 1/2006 | Lipton et al. | |
| 7,023,469 B1 | 4/2006 | Olson | |
| 7,167,519 B2 | 1/2007 | Comaniciu et al. | |
| 7,197,072 B1 * | 3/2007 | Hsu et al. | 375/240.02 |
| 7,227,893 B1 * | 6/2007 | Srinivasa et al. | 375/240.08 |
| 7,356,830 B1 * | 4/2008 | Dimitrova | 725/51 |
| 7,436,887 B2 | 10/2008 | Yeredor et al. | |
| 7,447,331 B2 * | 11/2008 | Brown et al. | 382/103 |
| 7,660,439 B1 * | 2/2010 | Lu et al. | 382/107 |
| 2001/0019357 A1 | 9/2001 | Ito et al. | |
| 2001/0033330 A1 | 10/2001 | Garoutte | |
| 2001/0035907 A1 | 11/2001 | Broemmelsiek | |
| 2002/0008758 A1 | 1/2002 | Broemmelsiek et al. | |
| 2002/0024446 A1 | 2/2002 | Grech-Cini | |
| 2002/0051058 A1 | 5/2002 | Ito et al. | |
| 2002/0082769 A1 | 6/2002 | Church et al. | |
| 2002/0095490 A1 | 7/2002 | Barker et al. | |
| 2002/0135483 A1 | 9/2002 | Merheim et al. | |
| 2002/0163521 A1 | 11/2002 | Ellenby et al. | |
| 2002/0191851 A1 | 12/2002 | Keinan | |
| 2003/0043160 A1 | 3/2003 | Elfving et al. | |
| 2003/0051255 A1 | 3/2003 | Bulman et al. | |
| 2003/0053659 A1 | 3/2003 | Pavlidis et al. | |
| 2003/0085992 A1 | 5/2003 | Arpa et al. | |
| 2003/0231769 A1 * | 12/2003 | Bolle et al. | 380/210 |
| 2004/0113933 A1 | 6/2004 | Guler | |
| 2004/0161133 A1 * | 8/2004 | Elazar et al. | 382/115 |
| 2004/0240542 A1 | 12/2004 | Yeredor et al. | |
| 2005/0146605 A1 | 7/2005 | Lipton et al. | |
| 2005/0157169 A1 | 7/2005 | Brodsky et al. | |
| 2005/0162515 A1 | 7/2005 | Venetianer et al. | |
| 2005/0168574 A1 | 8/2005 | Lipton et al. | |
| 2006/0232673 A1 | 10/2006 | Lipton et al. | |
| 2006/0279630 A1 * | 12/2006 | Aggarwal et al. | 348/143 |
| 2007/0002141 A1 | 1/2007 | Lipton et al. | |
| 2007/0013776 A1 | 1/2007 | Venetianer et al. | |
| 2007/0052803 A1 | 3/2007 | Chosak et al. | |
| 2007/0127774 A1 | 6/2007 | Zhang et al. | |
| 2008/0100704 A1 | 5/2008 | Venetianer et al. | |

FOREIGN PATENT DOCUMENTS

| | | |
|---|---|---|
| EP | 0893823 A1 | 1/1999 |
| EP | 0893923 A1 | 1/1999 |
| EP | 0967584 A2 | 12/1999 |
| EP | 1024666 A2 | 8/2000 |
| EP | 1120746 A2 | 8/2001 |
| EP | 1333682 A1 | 8/2003 |
| JP | 09-247654 A | 9/1997 |
| JP | 10-048008 | 2/1998 |
| JP | 10290449 A | 10/1998 |
| JP | 2000-175174 | 6/2000 |
| JP | 2000-339923 | 8/2000 |
| JP | 2000-224542 | 11/2000 |
| JP | 2001-175868 | 6/2001 |
| JP | 2001-285681 | 10/2001 |
| WO | WO 94/03014 A1 | 2/1994 |
| WO | WO 01/62005 | 8/2001 |
| WO | WO-03/044727 A1 | 5/2003 |
| WO | WO-2004/006184 A2 | 1/2004 |

OTHER PUBLICATIONS

Written Opinion for International Patent Application No. PCT/US08/09073, dated Nov. 3, 2008.

International Search Report issued for PCT Application No. PCT/US06/25196, mailed on Jan. 16, 2008.

Written Opinion issued for PCT Application No. PCT/US06/25196, mailed on Jan. 16, 2008.

Shio et al., "Segmentation of People in Motion", IEEE 1991, p. 325-332.

International Search Report issued in PCT Application No. PCT/US2006/012556, mailed on Feb. 12, 2008.

Written Opinion issued in PCT Application No. PCT/US2006/012556, mailed on Feb. 12, 2008.

Notification for IL App. No. 161777 issued February 21, 2008 and English translation thereof.

CN Office Action for CN 02822772.7 on Oct. 14, 2005 in English.

International Search Report issued for PCT Application No. PCT/US06/45625, mailed on Sep. 24, 2007.

International Search Report issued for PCT Application No. PCT/US01/32614 on May 6, 2002.

International Search Report issued for PCT Application No. PCT/US02/22688 on Dec. 11, 2002.

Written Opinion of the International Searching Authority issued for PCT Application No. PCT/US06/45625, mailed on Sep. 24, 2007.

H. Fujiyoshi and A. J. Lipton, "Real-time Human Motion Analysis by Image Skeletonization," *Proceedings of IEEE WACV'98*, Princeton, NJ, 1998, pp. 15-21.

A. J. Lipton, H. Fujiyoshi and R. S. Patil, "Moving Target Classification and Tracking from Real-time Video," *Proceedings of IEEE WACV'98*, Princeton, NJ, 1998, pp. 8-14.

A. J. Lipton, "Local Application of Optic Flow to Analyse Rigid Versus Non-Rigid Motion," *International Conference on Computer Vision*, Corfu, Greece, Sep. 1999.

R. T. Collins, Y. Tsin, J. R. Miller, and A. J. Lipton "Using a DEM to Determine Geospatial Object Trajectories," CMU-RI-TR-98-19, 1998.

A. Selinger and L. Wixson, "Classifying Moving Objects as Rigid or Non-Rigid Without Correspondences," *Proceedings of DARPA Image Understanding Workshop*, Nov. 1, 1998, pp. 341-347.

Jemez Technology Corp., Variant iD Web-Site, www.variantid.com, printed Aug. 25, 2003.

Alan J. Lipton "Virtual Postman—An Illustrative Example of Virtual Video," International Journal of Robotics and Automation, vol. 15, No. 1, Jan. 2000, pp. 9-16.

Alan J. Lipton, "Virtual Postman—Real-Time, Interactive Virtual Video," IASTED Conference on Computer Graphics and Imaging (CGIM '99), Palm Springs, Oct. 25-27, 1999.

Robert T. Collins et al., "A System for Video Surveillance and Monitoring," Technical Report CMU-RI-TR-00-12, Robotics Institute, Carnegie Mellon University, May 2000.

L. Wixson et al., "Detecting Salient Motion by Accumulating Directionally-Consistent Flow," IEEE, 1999.

W.E.L. Grimson et al., "Using Adaptive Tracking to Classify and Monitor Activities in a Site," CVPR, pp. 22-29, Jun. 1998.

A.J. Lipton et al., "Moving Target Classification and Tracking from Real-time Video," IUW, pp. 129-136, 1998.

T.J. Olsen et al., "Moving Object Detection and Event Recognition Algorithm for Smart Cameras," IUW, pp. 159-175, May 1997.

A. J. Lipton, "Local Application of Optical Flow to Analyse Rigid Versus Non-Rigid Motion," International Conference on Computer Vision Frame Rate Workshop, Corfu, Greece, Sep. 1999.

F. Bartolini et al., "Counting people getting in and out of a bus by real-time image-sequence processing," IVC, 12(1):36-41, Jan. 1994.

M. Rossi et al., "Tracking and counting moving people," ICIP94, pp. 212-216, 1994.

C.R. Wren et al., "Pfinder: Real-time tracking of the human body," Vismod, 1995.

L. Khoudour et al., "Real-Time Pedestrian Counting by Active Linear Cameras," JEI, 5(4):452-459, Oct. 1996.

S. Ioffe et al., "Probabilistic Methods for Finding People," IJCV, 43(1):45-68, Jun. 2001.

M. Isard et al., "BraMBLe: A Bayesian Multiple-Blob Tracker," ICCV, 2001.

D.M. Gavrila, "The Visual Analysis of Human Movement: A Survey," CVIU, 73(1):82-98, Jan. 1999.

N. Haering et al., "Visual Event Detection," Video Computing Series, Editor Mubarak Shah, 2001.

Collins et al., "A System for Video Surveillance and Monitoring: VSAM Final Report," Technical Report CMU-RI-TR-00-12, Robotics Institute, Carnegie Mellon University, May 2000.

J.P. Deparis et al., "A Device for Counting Passengers Making Use of Two Active Linear Cameras: Comparison of Algorithms," IEEE, pp. 1629-1634, 1996.

C.R. Wren et al.. "Pfinder: Real-Time Tracking of the Human Body," PAMI, vol. 19, pp. 780-784, 1997.

M. Allmen et al., "Long—Range Spatiotemporal Motion Understanding Using Spatiotemporal Flow Curves," Proc. IEEE CVPR, Lahaina, Maui, Hawaii, pp. 303-309, 1991.

L. Wixson, "Detecting Salient Motion by Accumulating Directionally Consistent Flow", IEEE Trans. Pattern Anal. Mach. Intell., vol. 22, pp. 774-781, Aug. 2000.

International Search Report and Written Opinion in PCT/US06/02700, Apr. 13, 2007.

JP Office Action issued in PCT/US02/22688, along with an English Translation, Oct. 9, 2007.

\* cited by examiner

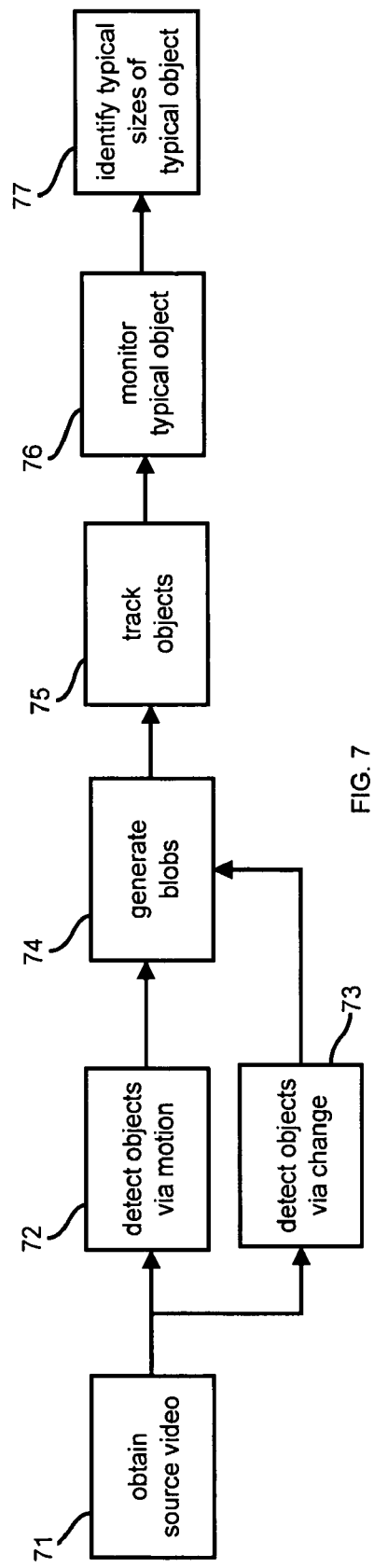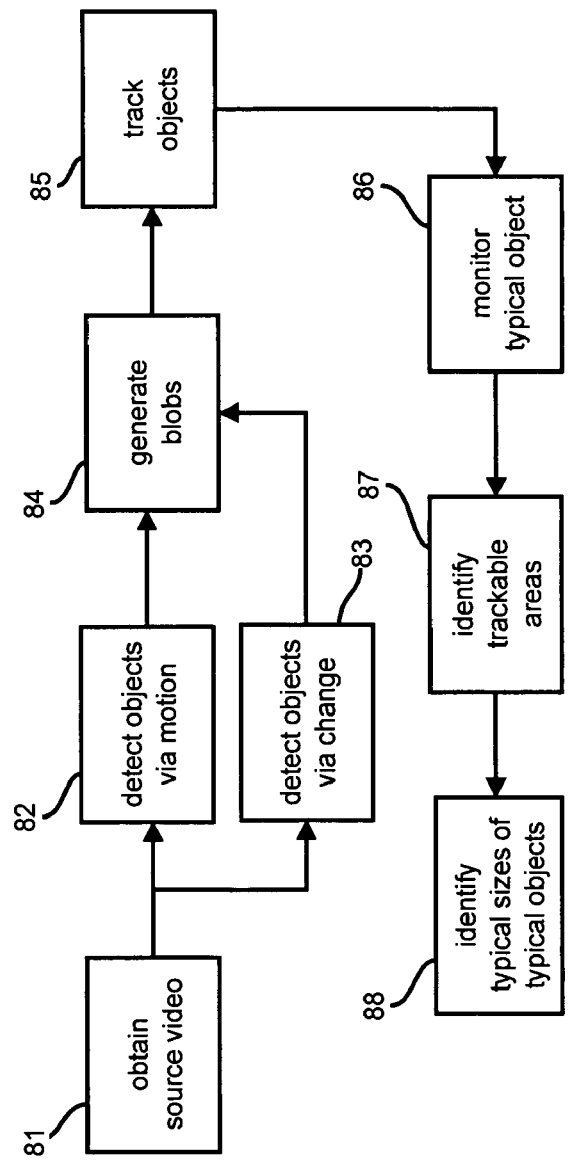

VIDEO SURVEILLANCE SYSTEM EMPLOYING VIDEO PRIMITIVES

CROSS-REFERENCE TO RELATED APPLICATIONS

This application is a continuation-in-part of U.S. patent application Ser. No. 11/057,154, filed on Feb. 15, 2005, which is a continuation-in-part of U.S. patent application Ser. No. 09/987,707, filed on Nov. 15, 2001, which claims the priority of U.S. patent application Ser. No. 09/694,712, filed on Oct. 24, 2000, all of which are incorporated herein by reference.

BACKGROUND OF THE INVENTION

Field of the Invention

The invention relates to a system for automatic video surveillance employing video primitives.

REFERENCES

For the convenience of the reader, the references referred to herein are listed below. In the specification, the numerals within brackets refer to respective references. The listed references are incorporated herein by reference.

The following references describe moving target detection:

{1} A. Lipton, H. Fujiyoshi and R. S. Patil, "Moving Target Detection and Classification from Real-Time Video," *Proceedings of IEEE WACV '98*, Princeton, N.J., 1998, pp. 8-14.

{2} W. E. L. Grimson, et al., "Using Adaptive Tracking to Classify and Monitor Activities in a Site", *CVPR*, pp. 22-29, June 1998.

{3} A. J. Lipton, H. Fujiyoshi, R. S. Patil, "Moving Target Classification and Tracking from Real-time Video," *IUW*, pp. 129-136, 1998.

{4} T. J. Olson and F. Z. Brill, "Moving Object Detection and Event Recognition Algorithm for Smart Cameras," *IUW*, pp. 159-175, May 1997.

The following references describe detecting and tracking humans:

{5} A. J. Lipton, "Local Application of Optical Flow to Analyse Rigid Versus Non-Rigid Motion," *International Conference on Computer Vision*, Corfu, Greece, September 1999.

{6} F. Bartolini, V. Cappellini, and A. Mecocci, "Counting people getting in and out of a bus by real-time image-sequence processing," *IVC*, 12(1):36-41, January 1994.

{7} M. Rossi and A. Bozzoli, "Tracking and counting moving people," *ICIP94*, pp. 212-216, 1994.

{8} C. R. Wren, A. Azarbayejani, T. Darrell, and A. Pentland, "Pfinder: Real-time tracking of the human body," *Vismod*, 1995.

{9} L. Khoudour, L. Duvieubourg, J. P. Deparis, "Real-Time Pedestrian Counting by Active Linear Cameras," *JEI*, 5(4):452-459, October 1996.

{10} S. Ioffe, D. A. Forsyth, "Probabilistic Methods for Finding People," *IJCV* 43(1):45-68, June 2001.

{11} M. Isard and J. MacCormick, "BraMBLe: A Bayesian Multiple-Blob Tracker," *ICCV*, 2001.

The following references describe blob analysis:

{12} D. M. Gavrila, "The Visual Analysis of Human Movement: A Survey," *CVIU*, 73(1):82-98, January 1999.

{13} Niels Haering and Niels da Vitoria Lobo, "Visual Event Detection," *Video Computing Series*, Editor Mubarak Shah, 2001.

The following references describe blob analysis for trucks, cars, and people:

{14} Collins, Lipton, Kanade, Fujiyoshi, Duggins, Tsin, Tolliver, Enomoto, and Hasegawa, "A System for Video Surveillance and Monitoring: VSAM Final Report," Technical Report CMU-RI-TR-00-12, Robotics Institute, Carnegie Mellon University, May 2000.

{15} Lipton, Fujiyoshi, and Patil, "Moving Target Classification and Tracking from Real-time Video," 98 *Darpa IUW*, November 20-23, 1998.

The following reference describes analyzing a single-person blob and its contours:

{16} C. R. Wren, A. Azarbayejani, T. Darrell, and A. P. Pentland. "Pfinder: Real-Time Tracking of the Human Body," *PAMI*, vol 19, pp. 780-784, 1997.

The following reference describes internal motion of blobs, including any motion-based segmentation:

{17} M. Allmen and C. Dyer, "Long—Range Spatiotemporal Motion Understanding Using Spatiotemporal Flow Curves," *Proc. IEEE CVPR*, Lahaina, Maui, Hawaii, pp. 303-309, 1991.

{18} L. Wixson, "Detecting Salient Motion by Accumulating Directionally Consistent Flow", IEEE Trans. Pattern Anal. Mach. Intell., vol. 22, pp. 774-781, August 2000.

BACKGROUND OF THE INVENTION

Video surveillance of public spaces has become extremely widespread and accepted by the general public. Unfortunately, conventional video surveillance systems produce such prodigious volumes of data that an intractable problem results in the analysis of video surveillance data.

A need exists to reduce the amount of video surveillance data so analysis of the video surveillance data can be conducted.

A need exists to filter video surveillance data to identify desired portions of the video surveillance data.

SUMMARY OF THE INVENTION

An object of the invention is to reduce the amount of video surveillance data so analysis of the video surveillance data can be conducted.

An object of the invention is to filter video surveillance data to identify desired portions of the video surveillance data.

An object of the invention is to produce a real time alarm based on an automatic detection of an event from video surveillance data.

An object of the invention is to integrate data from surveillance sensors other than video for improved searching capabilities.

An object of the invention is to integrate data from surveillance sensors other than video for improved event detection capabilities The invention includes an article of manufacture, a method, a system, and an apparatus for video surveillance.

The article of manufacture of the invention includes a computer-readable medium comprising software for a video surveillance system, comprising code segments for operating the video surveillance system based on video primitives.

The article of manufacture of the invention includes a computer-readable medium comprising software for a video surveillance system, comprising code segments for accessing archived video primitives, and code segments for extracting event occurrences from accessed archived video primitives.

The system of the invention includes a computer system including a computer-readable medium having software to operate a computer in accordance with the invention.

The apparatus of the invention includes a computer including a computer-readable medium having software to operate the computer in accordance with the invention.

The article of manufacture of the invention includes a computer-readable medium having software to operate a computer in accordance with the invention.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DEFINITIONS

A "video" refers to motion pictures represented in analog and/or digital form. Examples of video include: television, movies, image sequences from a video camera or other observer, and computer-generated image sequences.

A "frame" refers to a particular image or other discrete unit within a video.

An "object" refers to an item of interest in a video. Examples of an object include: a person, a vehicle, an animal, and a physical subject.

An "activity" refers to one or more actions and/or one or more composites of actions of one or more objects. Examples of an activity include: entering; exiting; stopping; moving; raising; lowering; growing; and shrinking.

A "location" refers to a space where an activity may occur. A location can be, for example, scene-based or image-based. Examples of a scene-based location include: a public space; a store; a retail space; an office; a warehouse; a hotel room; a hotel lobby; a lobby of a building; a casino; a bus station; a train station; an airport; a port; a bus; a train; an airplane; and a ship. Examples of an image-based location include: a video image; a line in a video image; an area in a video image; a rectangular section of a video image; and a polygonal section of a video image.

An "event" refers to one or more objects engaged in an activity. The event may be referenced with respect to a location and/or a time.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

BRIEF DESCRIPTION OF THE DRAWINGS

Embodiments of the invention are explained in greater detail by way of the drawings, where the same reference numerals refer to the same features.

FIG. 7 illustrates a flow diagram for semi-automatic calibration of the video surveillance system.

FIG. 8 illustrates a flow diagram for automatic calibration of the video surveillance system.

DETAILED DESCRIPTION OF THE INVENTION

Figure 1:
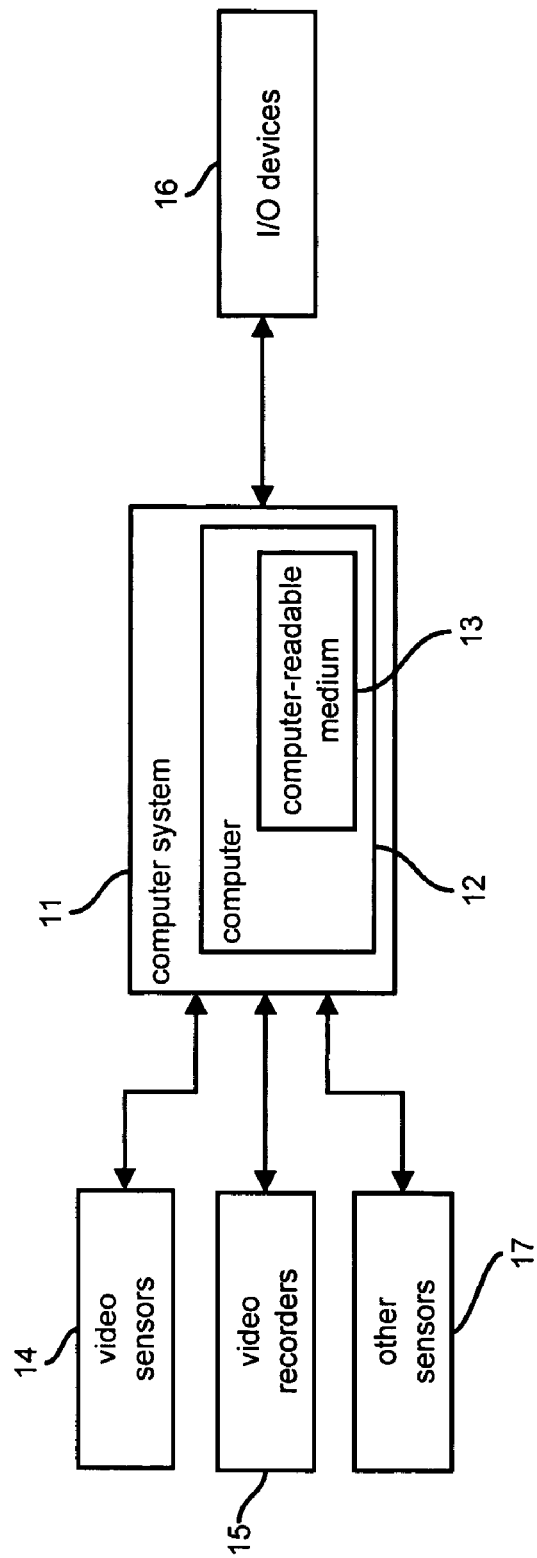
FIG. 1 illustrates a plan view of the video surveillance system of the invention.

The automatic video surveillance system of the invention is for monitoring a location for, for example, market research or security purposes. The system can be a dedicated video surveillance installation with purpose-built surveillance components, or the system can be a retrofit to existing video surveillance equipment that piggybacks off the surveillance video feeds. The system is capable of analyzing video data from live sources or from recorded media. The system is capable of processing the video data in real-time, and storing the extracted video primitives to allow very high speed forensic event detection later. The system can have a prescribed response to the analysis, such as record data, activate an alarm mechanism, or activate another sensor system. The system is also capable of integrating with other surveillance system components. The system may be used to produce, for example, security or market research reports that can be tailored according to the needs of an operator and, as an option, can be presented through an interactive web-based interface, or other reporting mechanism.

An operator is provided with maximum flexibility in configuring the system by using event discriminators. Event discriminators are identified with one or more objects (whose descriptions are based on video primitives), along with one or more optional spatial attributes, and/or one or more optional temporal attributes. For example, an operator can define an event discriminator (called a "loitering" event in this example) as a "person" object in the "automatic teller machine" space for "longer than 15 minutes" and "between 10:00 p.m. and 6:00 a.m." Event discriminators can be combined with modified Boolean operators to form more complex queries.

Although the video surveillance system of the invention draws on well-known computer vision techniques from the public domain, the inventive video surveillance system has several unique and novel features that are not currently available. For example, current video surveillance systems use large volumes of video imagery as the primary commodity of information interchange. The system of the invention uses video primitives as the primary commodity with representative video imagery being used as collateral evidence. The system of the invention can also be calibrated (manually, semi-automatically, or automatically) and thereafter automatically can infer video primitives from video imagery. The system can further analyze previously processed video without needing to reprocess completely the video. By analyzing previously processed video, the system can perform inference analysis based on previously recorded video primitives, which greatly improves the analysis speed of the computer system.

The use of video primitives may also significantly reduce the storage requirements for the video. This is because the event detection and response subsystem uses the video only to illustrate the detections. Consequently, video may be stored or transmitted at a lower quality. In a potential embodiment, the video may be stored or transmitted only when activity is detected, not all the time. In another potential embodiment, the quality of the stored or transmitted video may be dependent on whether activity is detected: video can be stored or transmitted at higher quality (higher frame-rate and/or bit-rate) when activity is detected and at lower quality at other times. In another exemplary embodiment, the video storage and database may be handled separately, e.g., by a digital video recorder (DVR), and the video processing subsystem may just control whether data is stored and with what quality. In another embodiment, the video surveillance system (or components thereof) may be on a processing device (such as general purpose processor, DSP, microcontroller, ASIC, FPGA, or other device) on board a video management device such as a digital video camera, network video server, DVR, or Network Video Recorder (NVR), and the bandwidth of video streamed from the device can be modulated by the system. High quality video (high bit-rate or frame-rate) need only be transmitted through an IP video network only when activities of interest are detected. In this embodiment, primitives from intelligence-enabled devices can be broadcast via a network to multiple activity inference applications at physically different locations to enable a single camera network to provide multi-purpose applications through decentralized processing.

Figure 22:
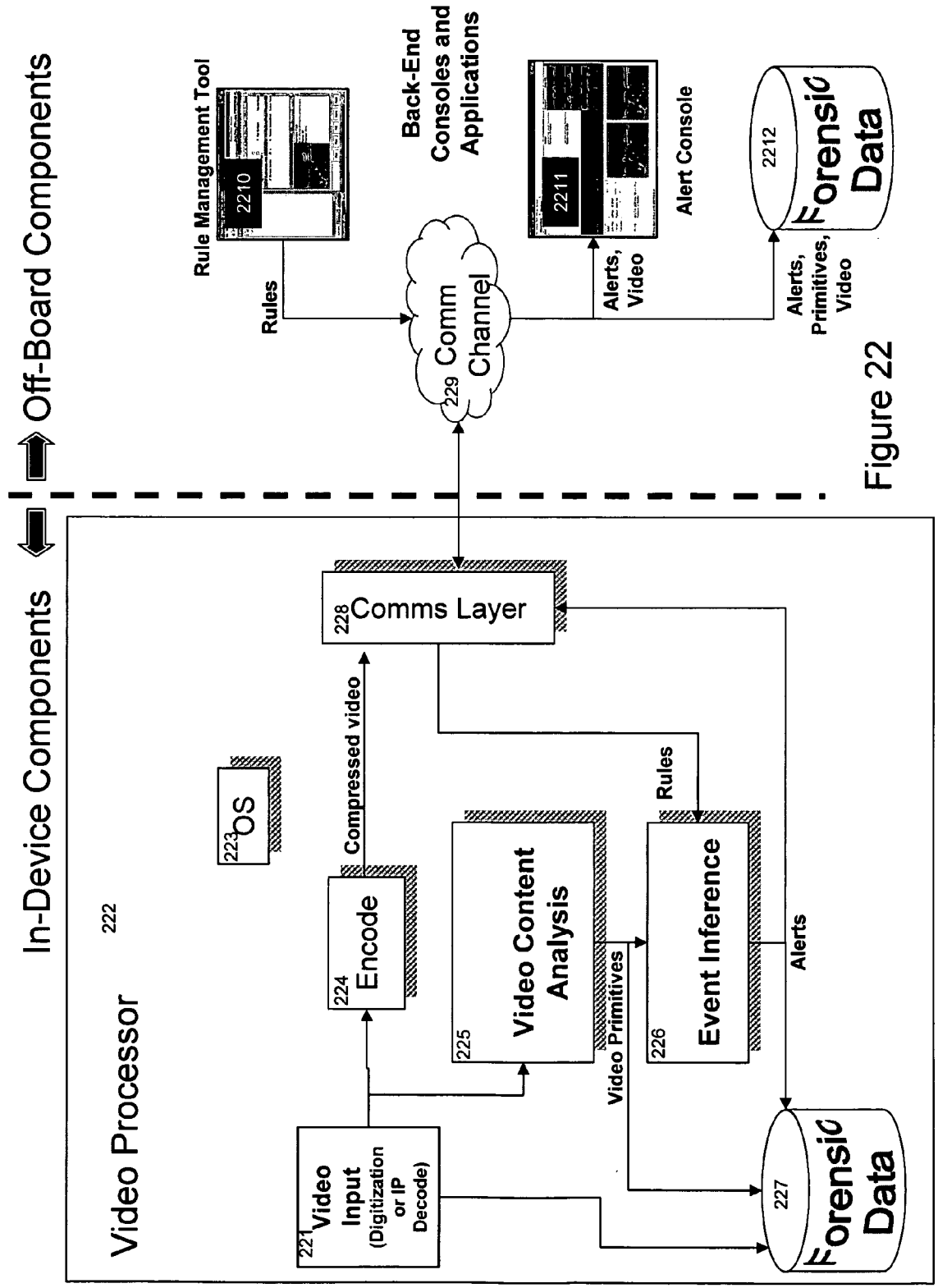
FIG. 22 shows an exemplary configuration of a video surveillance system according to an embodiment of the invention.

FIG. 22 shows one configuration of an implementation of the video surveillance system. Block 221 represents a raw (uncompressed) digital video input. This can be obtained, for example, through analog to digital capture of an analog video signal or decoding of a digital video signal. Block 222 represents a hardware platform housing the main components of the video surveillance system (video content analysis—block 225—and activity inference—block 226). The hardware platform may contain other components such as an operating system (block 223); a video encoder (block 224) that compresses raw digital video for video streaming or storage using any available compression scheme (JPEG, MJPEG, MPEG1, MPEG2, MPEG4, H.263, H.264, Wavelet, or any other); a storage mechanism (block 227) for maintaining data such as video, compressed video, alerts, and video primitives—this storage device may be, for example, a hard-disk, on-board RAM, on-board FLASH memory, or other storage medium; and a communications layer (block 228) which may, for example, packetize and/or digitize data for transmission over a communication channel (block 229).

There may be other software components residing on computational platforms at other nodes of a network to which communications channel 229 connects. Block 2210 shows a rule management tool which is a user interface for creating video surveillance rules. Block 2211 shows an alert console for displaying alerts and reports to a user. Block 2212 shows a storage device (such as DVR, NVR, or PC) for storing alerts, primitives, and video for further after-the-fact processing.

Components on the hardware platform (block 222) may be implemented on any processing hardware (general purpose processor, microcontroller, DSP, ASIC, FPGA, or other processing device) on any video capture, processing, or management device such as a video camera, digital video camera, IP video camera, IP video server, digital video recorder (DVR), network video recorder (NVR), PC, laptop, or other device. There are a number of different possible modes of operation for this configuration.

In one mode, the system is programmed to look for specific events. When those events occur, alerts are transmitted via the communication channel (block 229) to other systems.

In another mode, video is streamed from the video device while it is analyzing the video data. When events occur, alerts are transmitted via the communication channel (block 229).

In another mode, video encoding and streaming is modulated by the content analysis and activity inference. When there is no activity present (no primitives are being generates), no video (or low quality, bit-rate, frame rate, resolution)

is being streamed. When some activity is present (primitives are being generated), higher quality, bit-rate, frame rate, resolution video is streamed. When events of interest are detected by the event inference, very high quality, bit-rate, frame rate, resolution video is streamed.

In another mode of operation, information is stored in the on-board storage device (block 227). Stored data may consist of digital video (raw or compressed), video primitives, alerts, or other information. The stored video quality may also be controlled by the presence of primitives or alerts. When there are primitives and alerts, higher quality, bit-rate, frame rate, resolution video may be stored.

Figure 23:
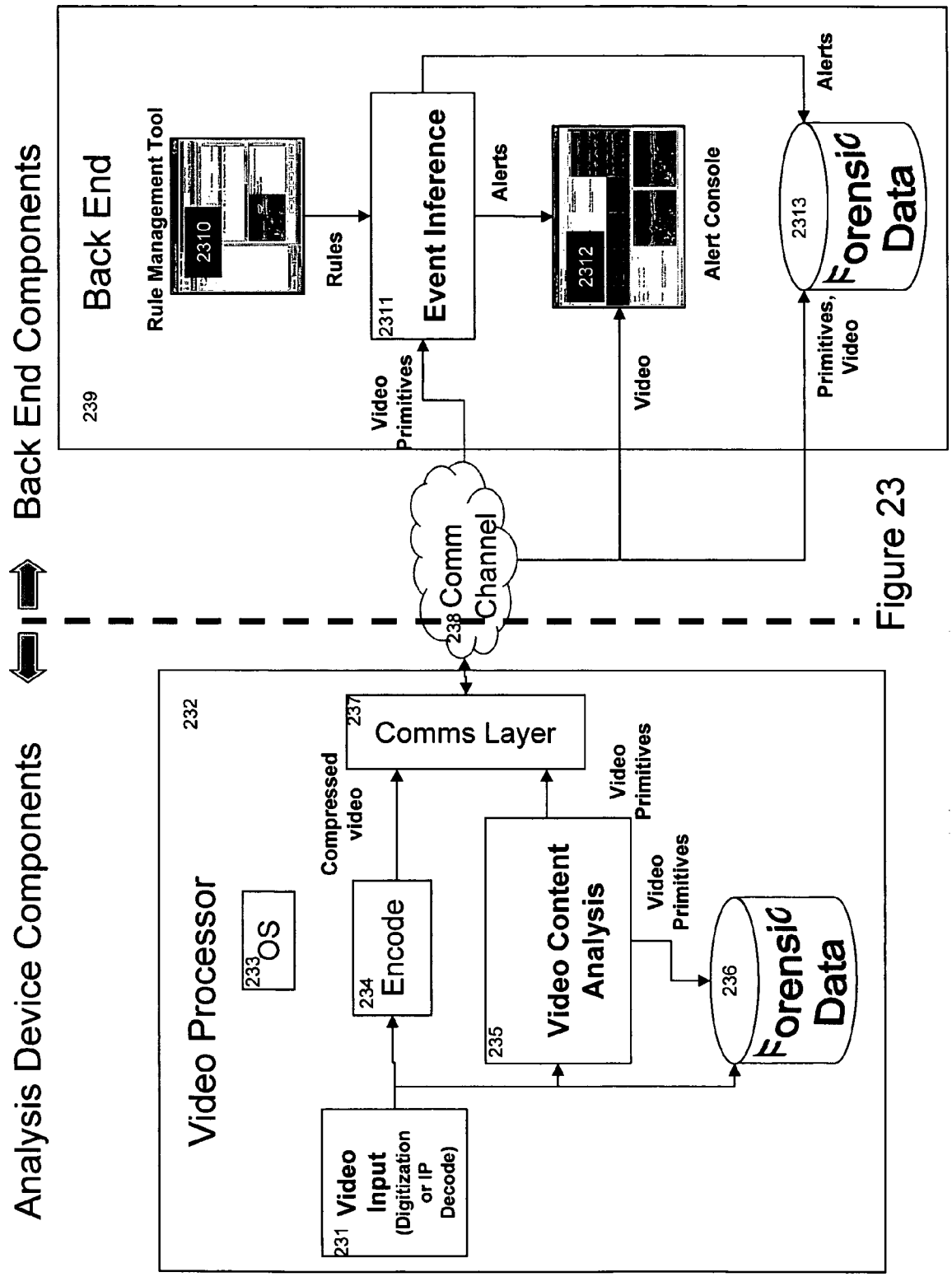
FIG. 23 shows another exemplary configuration of a video surveillance system according to an embodiment of the invention.

FIG. 23 shows another configuration of an implementation of the video surveillance system. Block 231 represents a raw (uncompressed) digital video input. This can be obtained, for example, through analog to digital capture of an analog video signal or decoding of a digital video signal. Block 232 represents a hardware platform housing the analysis component of the video surveillance system (block 235). The hardware platform may contain other components such as an operating system (block 233); a video encoder (block 234) that compresses raw digital video for video streaming or storage using any available compression scheme (JPEG, MJPEG, MPEG1, MPEG2, MPEG4, H.263, H.264, Wavelet, or any other); a storage mechanism (block 236) for maintaining data such as video, compressed video, alerts, and video primitives—this storage device may be, for example, a hard-disk, on-board RAM, on-board FLASH memory, or other storage medium; and a communications layer (block 237) that may, for example, packetize and/or digitize data for transmission over a communication channel (block 238). In the embodiment of the invention shown in FIG. 23, the activity inference component (block 2311) is shown on a separate hardware component (block 239) connected to a network to which communication channel 238 connects.

There may also be other software components residing on computational platforms at other nodes of this network (block 239). Block 2310 shows a rule management tool, which is a user interface for creating video surveillance rules. Block 2312 shows an alert console for displaying alerts and reports to a user. Block 2313 shows a storage device that could be physically located on the same hardware platform (such as a hard disk, floppy disk, other magnetic disk, CD, DVD, other optical dick, MD or other magneto-optical disk, solid state storage device such as RAM or FLASH RAM, or other storage device) or may be a separate storage device (such as external disk drive, PC, laptop, DVR, NVR, or other storage device).

Components on the hardware platform (block 222) may be implemented on any processing platform (general purpose processor, microcontroller, DSP, FPGA, ASIC or any other processing platform) on any video capture, processing, or management device such as a video camera, digital video camera, IP video camera, IP video server, digital video recorder (DVR), network video recorder (NVR), PC, laptop, or other device. Components on the back-end hardware platform (block 239) may be implemented on any processing hardware (general purpose processor, microcontroller, DSP, FPGA, ASIC, or any other device) on any processing device such as PC, laptop, single-board computer, DVR, NVR, video server, network router, hand-held device (such as video phone, pager, or PDA). There are a number of different possible modes of operation for this configuration.

In one mode, the system is programmed on the back-end device (or any other device connected to the back-end device) to look for specific events. The content analysis module (block 235) on the video processing platform (block 232) generates primitives that are transmitted to the back-end processing platform (block 239). The event inference module (block 2311) determines if the rules have been violated and generates alerts that can be displayed on an alert console (block 2312) or stored in a storage device (block 2313) for later analysis.

In another mode, video primitives and video can be stored in a storage device on the back-end platform (2313) for later analysis.

In another mode, stored video quality, bit-rate, frame rate, resolution can be modulated by alerts. When there is an alert, video can be stored at higher quality, bit-rate, frame rate, resolution.

In another mode, video primitives can be stored on the video processing device (block 236 in block 232) for later analysis via the communication channel.

In another mode, the quality of the video stored on the video processing device (in block 236 in block 232) may be modulated by the presence of primitives. When there are primitives (when something is happening) the quality, bit-rate, frame rate, resolution of the stored video can be increased.

In another mode, video can be streamed from the video processor via the encoder (234) to other devices on the network, via communication channel 238.

In another mode, video quality can be modulated by the content analysis module (235). When there are no primitives (nothing is happening), no (or low quality, bit-rate, frame rate, resolution) video is streamed. When there is activity, higher quality, bit-rate, frame rate, resolution video is streamed.

In another mode, streamed video quality, bit-rate, frame rate, resolution can be modulated by the presence of alerts. When the back end event inference module (block 2311) detects an event of interest, it can send a signal or command to the video processing component (block 232) requesting video (or higher quality, bit-rate, frame rate, resolution video). When this request is received, the video compression component (block 234) and communication layer (block 237) can change compression and streaming parameters.

In another mode the quality of video stored on board the video processing device (block 236 in block 232) can be modulated by the presence of alerts. When an alert is generated by the event inference module (block 2311) on the back end processor (block 239) it can send a message via the communication channel (block 238) to the video processor hardware (block 232) to increase the quality, bit-rate, frame rate, resolution of the video stored in the on board storage device (238).

Figure 24:
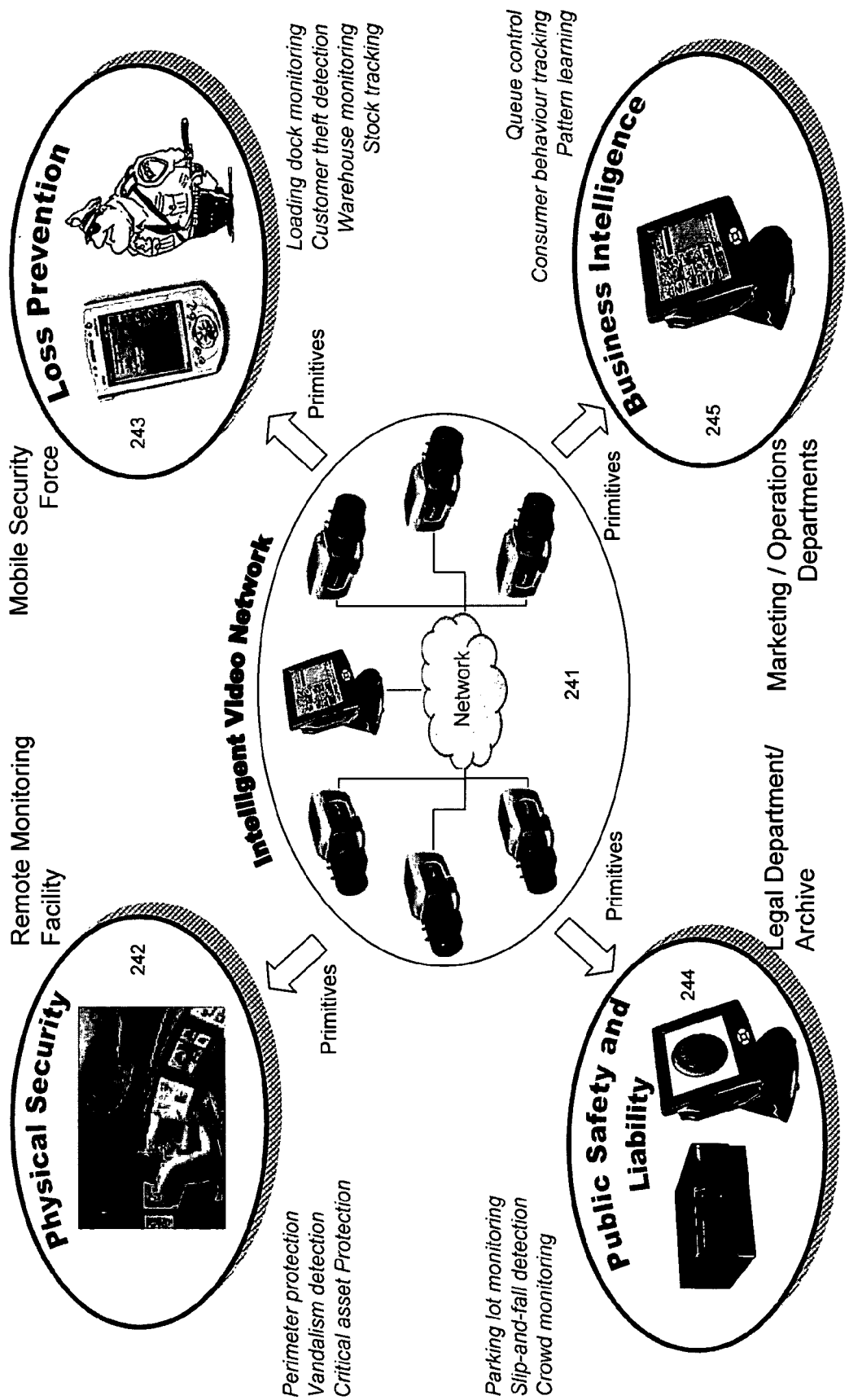
FIG. 24 shows another exemplary configuration of a video surveillance system according to an embodiment of the invention.

FIG. 24 shows an extension of the configuration described in FIG. 23. By separating the functionality of video content analysis and back end activity inference, it is possible to enable a multi-purpose intelligent video surveillance system through the process of late application binding. A single network of intelligence-enabled cameras can broadcast a single stream of video primitives to separate back-end applications in different parts of an organization (at different physical locations) and achieve multiple functions. This is possible because the primitive stream contains information about everything going on in the scene and is not tied to specific application areas. The example depicted in FIG. 24 pertains to a retail environment but is illustrative of the principal in general and is applicable to any other application areas and any other surveillance functionality. Block 241 shows an intelligence-enabled network of one or more video cameras within a facility or across multiple facilities. The content analysis component or components may reside on a processing device inside the cameras, in video servers, in network routers, on DVRs, on NVRs, on PCs, on laptops or any other video processing device connected to the network. From these content analysis components, streams of primitives are broadcast via standard networks to activity inference modules on back end processors (blocks 242-245) residing in physically different areas used for different purposes. The back end processors may be in computers, laptops, DVRs, NVRs, network routers, handheld devices (phones, pagers, PDAs) or other computing devices. One advantage to this decentralization is that there need not be a central processing application that must be programmed to do all the processing for all possible applications. Another advantage is security so that one part of an organization can perform activity inference on rules that are stored locally so that no one else in the network has access to that information.

In block 242 the primitive stream from the intelligent camera network is analyzed for physical security applications: to determine if there has been a perimeter breach, vandalism, and to protect critical assets. Of course, these applications are merely exemplary, and any other application is possible.

In block 243 the primitive stream from the intelligent camera network is analyzed for loss prevention applications: to monitor a loading dock; to watch for customer or employee theft, to monitor a warehouse, and to track stock. Of course, these applications are merely exemplary, and any other application is possible.

In block 244 the primitive stream from the intelligent camera network is analyzed for public safety and liability applications: to monitor for people or vehicle moving too fast in parking lots, to watch for people slipping and falling, and to monitor crowds in and around the facility. Of course, these applications are merely exemplary, and any other application is possible.

In block 245 the primitive stream from the intelligent camera network is analyzed for business intelligence applications: to watch the lengths of queues, to track consumer behavior, to learn patterns of behavior, to perform building management tasks such as controlling lighting and heating when there are no people present. Of course, these applications are merely exemplary, and any other application is possible.

Figure 25:
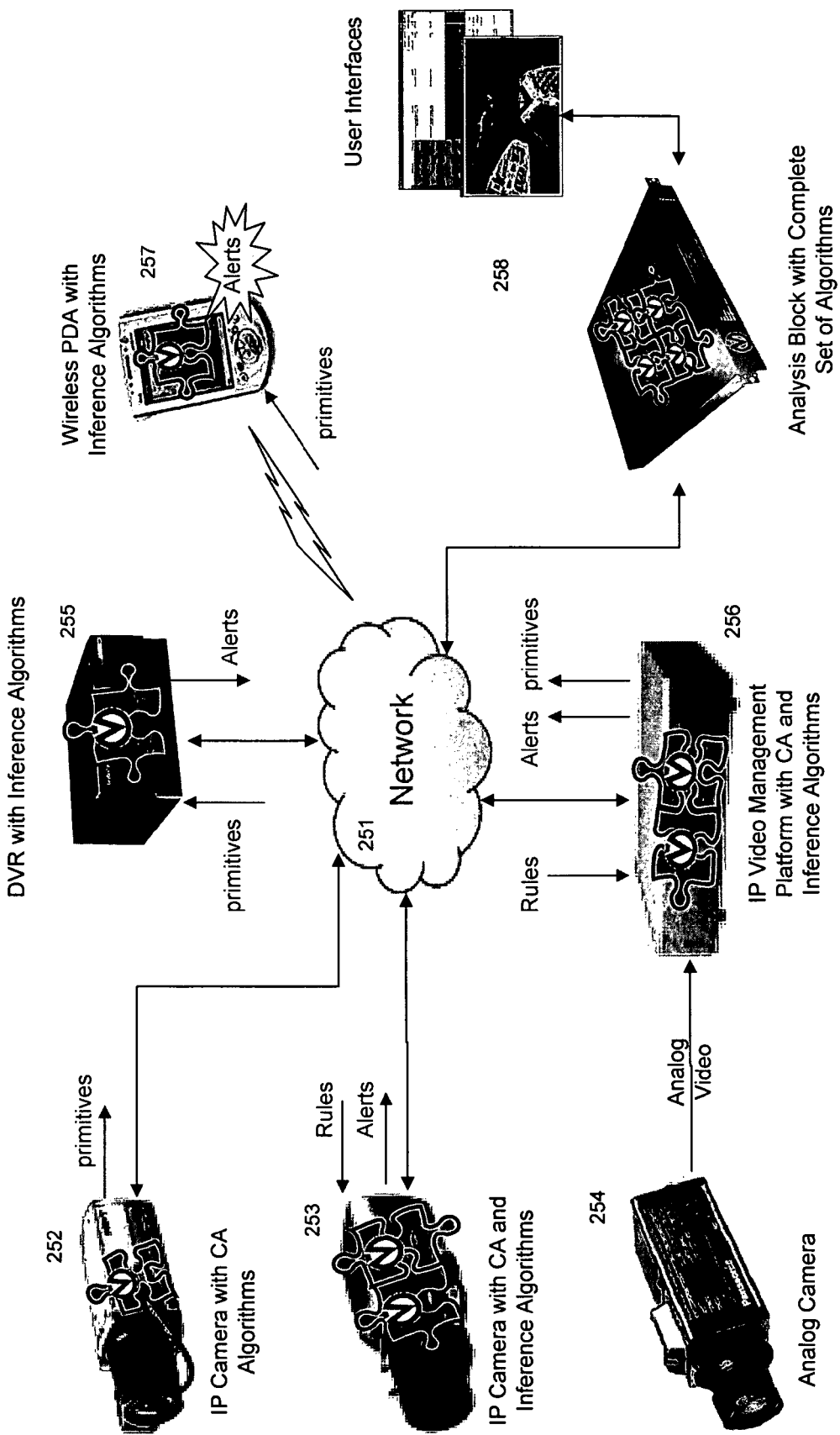
FIG. 25 shows a network that may be used in exemplary configurations of embodiments of the invention.

FIG. 25 shows a network (block 251) with a number of potential intelligence-enabled devices connected to it. Block 252 is an IP camera with content analysis components on board that can stream primitives over a network. Block 253 is an IP camera with both content analysis and activity inference components on board that can be programmed directly with rules and will generate network alerts directly. Block 254 is a standard analog camera with no intelligent components on board; but it is connected to an IP video management platform (block 256) that performs video digitization and compression as well as content analysis and activity inference. It can be programmed with view-specific rules and is capable of transmitting primitive streams and alerts via a network. Block 255 is a DVR with activity inference components that is capable of ingesting primitive streams from other devices and generating alerts. Block 257 is a handheld PDA enabled with wireless network communications that has activity inference algorithms on board and is capable of accepting video primitives from the network and displaying alerts. Block 258 is complete intelligent video analysis system capable of accepting analog or digital video streams, performing content analysis and activity inference and displaying alerts on a series of alert consoles.

As another example, the system of the invention provides unique system tasking. Using equipment control directives, current video systems allow a user to position video sensors and, in some sophisticated conventional systems, to mask out regions of interest or disinterest. Equipment control directives are instructions to control the position, orientation, and focus of video cameras. Instead of equipment control directives, the system of the invention uses event discriminators based on video primitives as the primary tasking mechanism. With event discriminators and video primitives, an operator is provided with a much more intuitive approach over conventional systems for extracting useful information from the system. Rather than tasking a system with an equipment control directives, such as "camera A pan 45 degrees to the left," the system of the invention can be tasked in a human-intuitive manner with one or more event discriminators based on video primitives, such as "a person enters restricted area A."

Using the invention for market research, the following are examples of the type of video surveillance that can be performed with the invention: counting people in a store; counting people in a part of a store; counting people who stop in a particular place in a store; measuring how long people spend in a store; measuring how long people spend in a part of a store; and measuring the length of a line in a store.

Using the invention for security, the following are examples of the type of video surveillance that can be performed with the invention: determining when anyone enters a restricted area and storing associated imagery; determining when a person enters an area at unusual times; determining when changes to shelf space and storage space occur that might be unauthorized; determining when passengers aboard an aircraft approach the cockpit; determining when people tailgate through a secure portal; determining if there is an unattended bag in an airport; and determining if there is a theft of an asset.

An exemplary application area may be access control, which may include, for example: detecting if a person climbs over a fence, or enters a prohibited area; detecting if someone moves in the wrong direction (e.g., at an airport, entering a secure area through the exit); determining if a number of objects detected in an area of interest does not match an expected number based on RFID tags or card-swipes for entry, indicating the presence of unauthorized personnel. This may also be useful in a residential application, where the video surveillance system may be able to differentiate between the motion of a person and pet, thus eliminating most false alarms. Note that in many residential applications, privacy may be of concern; for example, a homeowner may not wish to have another person remotely monitoring the home and to be able to see what is in the house and what is happening in the house. Therefore, in some embodiments used in such applications, the video processing may be performed locally, and optional video or snapshots may be sent to one or more remote monitoring stations only when necessary (for example, but not limited to, detection of criminal activity or other dangerous situations).

Another exemplary application area may be asset monitoring. This may mean detecting if an object is taken away from the scene, for example, if an artifact is removed from a museum. In a retail environment asset monitoring can have several aspects to it and may include, for example: detecting if a single person takes a suspiciously large number of a given item; determining if a person exits through the entrance, particularly if doing this while pushing a shopping cart; determining if a person applies a non-matching price tag to an item, for example, filling a bag with the most expensive type of coffee but using a price tag for a less expensive type; or detecting if a person leaves a loading dock with large boxes.

Another exemplary application area may be for safety purposes. This may include, for example: detecting if a person slips and falls, e.g., in a store or in a parking lot; detecting if a car is driving too fast in a parking lot; detecting if a person is too close to the edge of the platform at a train or subway station while there is no train at the station; detecting if a person is on the rails; detecting if a person is caught in the door of a train when it starts moving; or counting the number of people entering and leaving a facility, thus keeping a precise headcount, which can be very important in case of an emergency.

Another exemplary application area may be traffic monitoring. This may include detecting if a vehicle stopped, especially in places like a bridge or a tunnel, or detecting if a vehicle parks in a no parking area.

Another exemplary application area may be terrorism prevention. This may include, in addition to some of the previously-mentioned applications, detecting if an object is left behind in an airport concourse, if an object is thrown over a fence, or if an object is left at a rail track; detecting a person loitering or a vehicle circling around critical infrastructure; or detecting a fast-moving boat approaching a ship in a port or in open waters.

Another exemplary application area may be in care for the sick and elderly, even in the home. This may include, for example, detecting if the person falls; or detecting unusual behavior, like the person not entering the kitchen for an extended period of time.

FIG. 1 illustrates a plan view of the video surveillance system of the invention. A computer system 11 comprises a computer 12 having a computer-readable medium 13 embodying software to operate the computer 12 according to the invention. The computer system 11 is coupled to one or more video sensors 14, one or more video recorders 15, and one or more input/output (I/O) devices 16. The video sensors 14 can also be optionally coupled to the video recorders 15 for direct recording of video surveillance data. The computer system is optionally coupled to other sensors 17.

The video sensors 14 provide source video to the computer system 11. Each video sensor 14 can be coupled to the computer system 11 using, for example, a direct connection (e.g., a firewire digital camera interface) or a network. The video sensors 14 can exist prior to installation of the invention or can be installed as part of the invention. Examples of a video sensor 14 include: a video camera; a digital video camera; a color camera; a monochrome camera; a camera; a camcorder; a PC camera; a webcam; an infra-red video camera; and a CCTV camera.

The video recorders 15 receive video surveillance data from the computer system 11 for recording and/or provide source video to the computer system 11. Each video recorder 15 can be coupled to the computer system 11 using, for example, a direct connection or a network. The video recorders 15 can exist prior to installation of the invention or can be installed as part of the invention. The video surveillance system in the computer system 11 may control when and with what quality setting a video recorder 15 records video. Examples of a video recorder 15 include: a video tape recorder; a digital video recorder; a network video recorder; a video disk; a DVD; and a computer-readable medium. The system may also modulate the bandwidth and quality of video streamed over a network by controlling a video encoder and streaming protocol. When activities of interest are detected, higher bit-rate, frame-rate, or resolution imagery may be encoded and streamed.

The I/O devices 16 provide input to and receive output from the computer system 11. The I/O devices 16 can be used to task the computer system 11 and produce reports from the computer system 11. Examples of I/O devices 16 include: a keyboard; a mouse; a stylus; a monitor; a printer; another computer system; a network; and an alarm.

The other sensors 17 provide additional input to the computer system 11. Each other sensor 17 can be coupled to the computer system 11 using, for example, a direct connection or a network. The other sensors 17 can exit prior to installation of the invention or can be installed as part of the invention. Examples of another sensor 17 include, but are not limited to: a motion sensor; an optical tripwire; a biometric sensor; an RFID sensor; and a card-based or keypad-based authorization system. The outputs of the other sensors 17 can be recorded by the computer system 11, recording devices, and/or recording systems.

Figure 2:
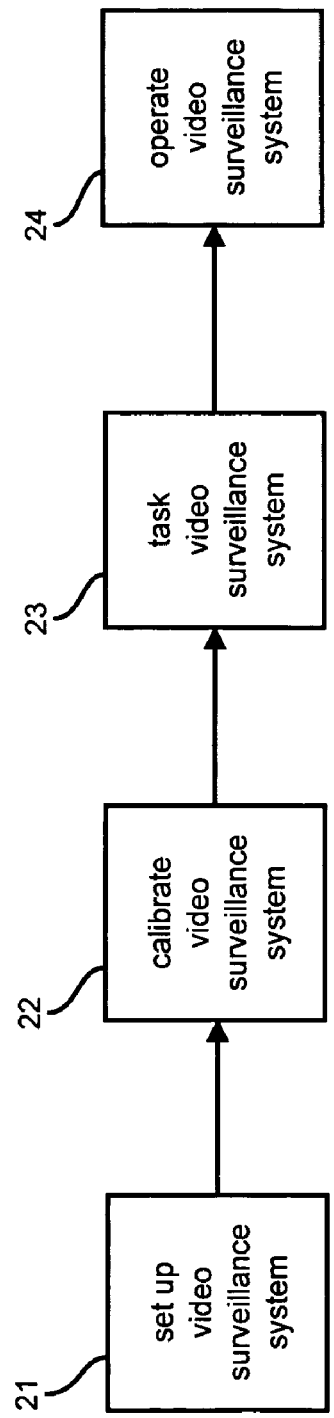
FIG. 2 illustrates a flow diagram for the video surveillance system of the invention.

FIG. 2 illustrates a flow diagram for the video surveillance system of the invention. Various aspects of the invention are exemplified with reference to FIGS. 10-15, which illustrate examples of the video surveillance system of the invention applied to monitoring a grocery store.

In block 21, the video surveillance system is set up as discussed for FIG. 1. Each video sensor 14 is orientated to a location for video surveillance. The computer system 11 is connected to the video feeds from the video equipment 14 and 15. The video surveillance system can be implemented using existing equipment or newly installed equipment for the location.

In block 22, the video surveillance system is calibrated. Once the video surveillance system is in place from block 21, calibration occurs. The result of block 22 is the ability of the video surveillance system to determine an approximate absolute size and speed of a particular object (e.g., a person) at various places in the video image provided by the video sensor. The system can be calibrated using manual calibration, semi-automatic calibration, and automatic calibration. Calibration is further described after the discussion of block 24.

In block 23 of FIG. 2, the video surveillance system is tasked. Tasking occurs after calibration in block 22 and is optional. Tasking the video surveillance system involves specifying one or more event discriminators. Without tasking, the video surveillance system operates by detecting and archiving video primitives and associated video imagery without taking any action, as in block 45 in FIG. 4.

Figure 3:
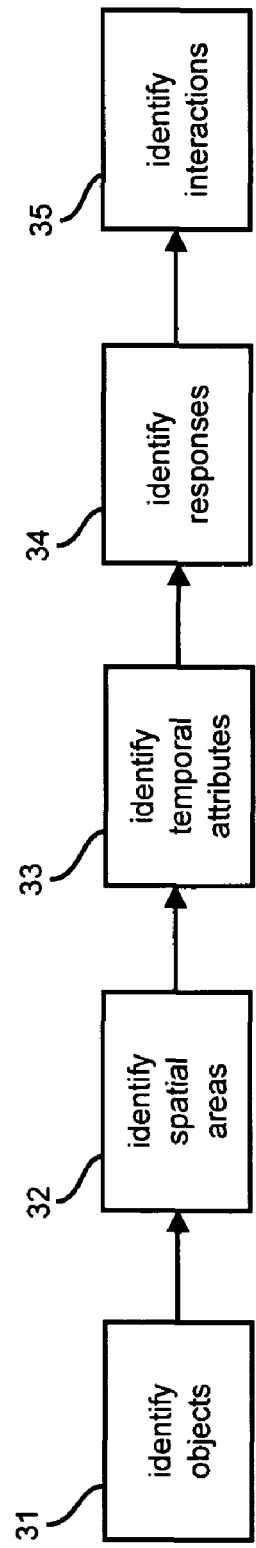
FIG. 3 illustrates a flow diagram for tasking the video surveillance system.

FIG. 3 illustrates a flow diagram for tasking the video surveillance system to determine event discriminators. An event discriminator refers to one or more objects optionally interacting with one or more spatial attributes and/or one or more temporal attributes. An event discriminator is described in terms of video primitives (also called activity description meta-data). Some of the video primitive design criteria include the following: capability of being extracted from the video stream in real-time; inclusion of all relevant information from the video; and conciseness of representation.

Real-time extraction of the video primitives from the video stream is desirable to enable the system to be capable of generating real-time alerts, and to do so, since the video provides a continuous input stream, the system cannot fall behind.

The video primitives should also contain all relevant information from the video, since at the time of extracting the video primitives, the user-defined rules are not known to the system. Therefore, the video primitives should contain information to be able to detect any event specified by the user, without the need for going back to the video and reanalyzing it.

A concise representation is also desirable for multiple reasons. One goal of the proposed invention may be to extend the storage recycle time of a surveillance system. This may be achieved by replacing storing good quality video all the time by storing activity description meta-data and video with quality dependent on the presence of activity, as discussed above. Hence, the more concise the video primitives are, the more data can be stored. In addition, the more concise the video primitive representation, the faster the data access becomes, and this, in turn may speed up forensic searching.

The exact contents of the video primitives may depend on the application and potential events of interest. Some exemplary embodiments are described below An exemplary embodiment of the video primitives may include scene/video descriptors, describing the overall scene and video. In general, this may include a detailed description of the appearance of the scene, e.g., the location of sky, foliage, man-made objects, water, etc; and/or meteorological conditions, e.g., the presence/absence of precipitation, fog, etc. For a video surveillance application, for example, a change in the overall view may be important. Exemplary descriptors may describe sudden lighting changes; they may indicate camera motion, especially the facts that the camera started or stopped moving, and in the latter case, whether it returned to its previous view or at least to a previously known view; they may indicate changes in the quality of the video feed, e.g., if it suddenly became noisier or went dark, potentially indicating tampering with the feed; or they may show a changing waterline along a body of water (for further information on specific approaches to this latter problem, one may consult, for example, co-pending U.S. patent application Ser. No. 10/954,479, filed on Oct. 1, 2004, and incorporated herein by reference).

Another exemplary embodiment of the video primitives may include object descriptors referring to an observable attribute of an object viewed in a video feed. What information is stored about an object may depend on the application area and the available processing capabilities. Exemplary object descriptors may include generic properties including, but not limited to, size, shape, perimeter, position, trajectory, speed and direction of motion, motion salience and its features, color, rigidity, texture, and/or classification. The object descriptor may also contain some more application and type specific information: for humans, this may include the presence and ratio of skin tone, gender and race information, some human body model describing the human shape and pose; or for vehicles, it may include type (e.g., truck, SUV, sedan, bike, etc.), make, model, license plate number. The object descriptor may also contain activities, including, but not limited to, carrying an object, running, walking, standing up, or raising arms. Some activities, such as talking, fighting or colliding, may also refer to other objects. The object descriptor may also contain identification information, including, but not limited to, face or gait.

Another exemplary embodiment of the video primitives may include flow descriptors describing the direction of motion of every area of the video. Such descriptors may, for example, be used to detect passback events, by detecting any motion in a prohibited direction (for further information on specific approaches to this latter problem, one may consult, for example, co-pending U.S. patent application Ser. No. 10/766,949, filed on Jan. 30, 2004, and incorporated herein by reference).

Primitives may also come from non-video sources, such as audio sensors, heat sensors, pressure sensors, card readers, RFID tags, biometric sensors, etc.

A classification refers to an identification of an object as belonging to a particular category or class. Examples of a classification include: a person; a dog; a vehicle; a police car; an individual person; and a specific type of object.

A size refers to a dimensional attribute of an object. Examples of a size include: large; medium; small; flat; taller than 6 feet; shorter than 1 foot; wider than 3 feet; thinner than 4 feet; about human size; bigger than a human; smaller than a human; about the size of a car; a rectangle in an image with approximate dimensions in pixels; and a number of image pixels.

Position refers to a spatial attribute of an object. The position may be, for example, an image position in pixel coordinates, an absolute real-world position in some world coordinate system, or a position relative to a landmark or another object.

A color refers to a chromatic attribute of an object. Examples of a color include: white; black; grey; red; a range of HSV values; a range of YUV values; a range of RGB values; an average RGB value; an average YUV value; and a histogram of RGB values.

Rigidity refers to a shape consistency attribute of an object. The shape of non-rigid objects (e.g., people or animals) may change from frame to frame, while that of rigid objects (e.g., vehicles or houses) may remain largely unchanged from frame to frame (except, perhaps, for slight changes due to turning).

A texture refers to a pattern attribute of an object. Examples of texture features include: self-similarity; spectral power; linearity; and coarseness.

An internal motion refers to a measure of the rigidity of an object. An example of a fairly rigid object is a car, which does not exhibit a great amount of internal motion. An example of a fairly non-rigid object is a person having swinging arms and legs, which exhibits a great amount of internal motion.

A motion refers to any motion that can be automatically detected. Examples of a motion include: appearance of an object; disappearance of an object; a vertical movement of an object; a horizontal movement of an object; and a periodic movement of an object.

A salient motion refers to any motion that can be automatically detected and can be tracked for some period of time. Such a moving object exhibits apparently purposeful motion. Examples of a salient motion include: moving from one place to another; and moving to interact with another object.

A feature of a salient motion refers to a property of a salient motion. Examples of a feature of a salient motion include: a trajectory; a length of a trajectory in image space; an approximate length of a trajectory in a three-dimensional representation of the environment; a position of an object in image space as a function of time; an approximate position of an object in a three-dimensional representation of the environment as a function of time; a duration of a trajectory; a velocity (e.g., speed and direction) in image space; an approximate velocity (e.g., speed and direction) in a three-dimensional representation of the environment; a duration of time at a velocity; a change of velocity in image space; an approximate change of velocity in a three-dimensional representation of the environment; a duration of a change of velocity; cessation of motion; and a duration of cessation of motion. A velocity refers to the speed and direction of an object at a particular time. A trajectory refers a set of (position, velocity) pairs for an object for as long as the object can be tracked or for a time period.

A scene change refers to any region of a scene that can be detected as changing over a period of time. Examples of a scene change include: an stationary object leaving a scene; an object entering a scene and becoming stationary; an object changing position in a scene; and an object changing appearance (e.g. color, shape, or size).

A feature of a scene change refers to a property of a scene change. Examples of a feature of a scene change include: a size of a scene change in image space; an approximate size of a scene change in a three-dimensional representation of the environment; a time at which a scene change occurred; a location of a scene change in image space; and an approximate location of a scene change in a three-dimensional representation of the environment.

A pre-defined model refers to an a priori known model of an object. Examples of a pre-defined model may include: an adult; a child; a vehicle; and a semi-trailer.

In block 31, one or more objects types of interests are identified in terms of video primitives or abstractions thereof. Examples of one or more objects include: an object; a person; a red object; two objects; two persons; and a vehicle.

In block 32, one or more spatial areas of interest are identified. An area refers to one or more portions of an image from a source video or a spatial portion of a scene being viewed by a video sensor. An area also includes a combination of areas from various scenes and/or images. An area can be an image-based space (e.g., a line, a rectangle, a polygon, or a circle in a video image) or a three-dimensional space (e.g., a cube, or an area of floor space in a building).

Figure 12:
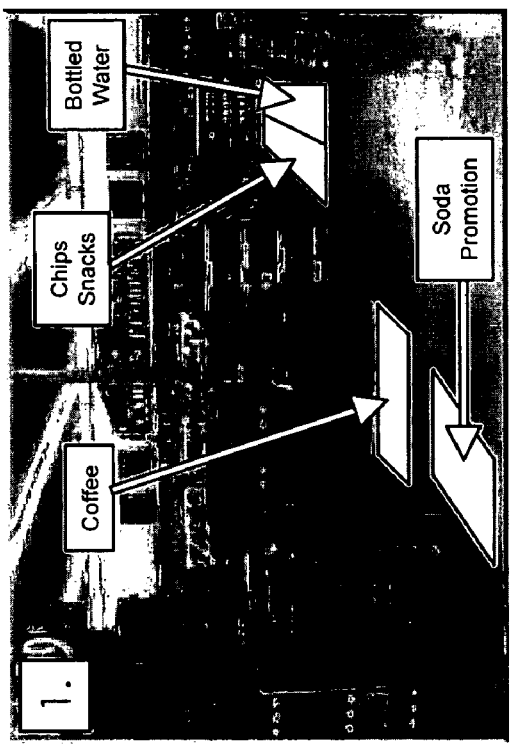

FIG. 12 illustrates identifying areas along an aisle in a grocery store. Four areas are identified: coffee; soda promotion; chips snacks; and bottled water. The areas are identified via a point-and-click interface with the system.

In block 33, one or more temporal attributes of interest are optionally identified. Examples of a temporal attribute include: every 15 minutes; between 9:00 p.m. to 6:30 a.m.; less than 5 minutes; longer than 30 seconds; over the weekend; and within 20 minutes of.

In block 34, a response is optionally identified. Examples of a response includes the following: activating a visual and/or audio alert on a system display; activating a visual and/or audio alarm system at the location; activating a silent alarm; activating a rapid response mechanism; locking a door; contacting a security service; forwarding data (e.g., image data, video data, video primitives; and/or analyzed data) to another computer system via a network, such as the Internet; saving such data to a designated computer-readable medium; activating some other sensor or surveillance system; tasking the computer system 11 and/or another computer system; and directing the computer system 11 and/or another computer system.

In block 35, one or more discriminators are identified by describing interactions between video primitives (or their abstractions), spatial areas of interest, and temporal attributes of interest. An interaction is determined for a combination of one or more objects identified in block 31, one or more spatial areas of interest identified in block 32, and one or more temporal attributes of interest identified in block 33. One or more responses identified in block 34 are optionally associated with each event discriminator.

Figure 16A:
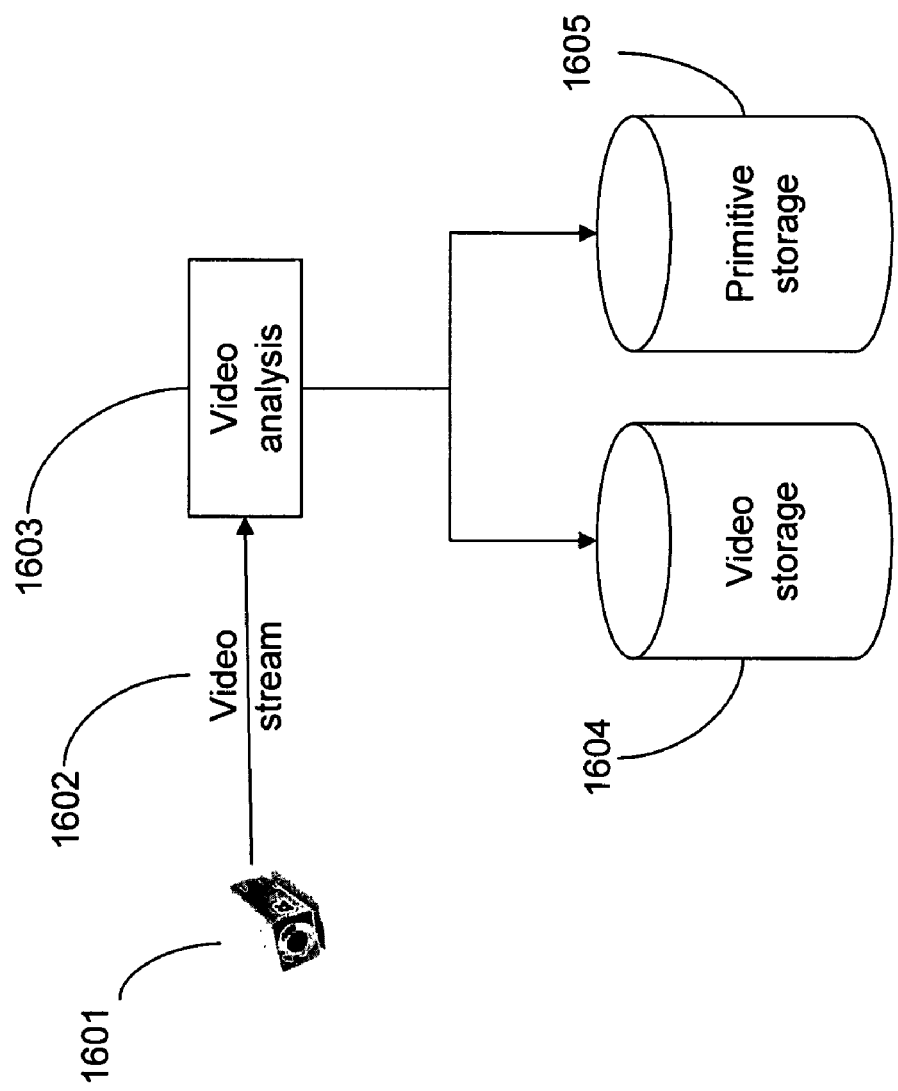
FIG. 16a shows a flow diagram of a video analysis subsystem according to an embodiment of the invention.

FIG. 16a shows an exemplary video analysis portion of a video surveillance system according to an embodiment of the invention. In FIG. 16a, a video sensor (for example, but not limited to, a video camera) 1601 may provide a video stream 1602 to a video analysis subsystem 1603. Video analysis subsystem 1603 may then perform analysis of the video stream 1602 to derive video primitives, which may be stored in primitive storage 1605. Primitive storage 1605 may be used to store non-video primitives, as well. Video analysis subsystem 1603 may further control storage of all or portions of the video stream 1602 in video storage 1604, for example, quality and/or quantity of video, as discussed above.

Figure 16B:
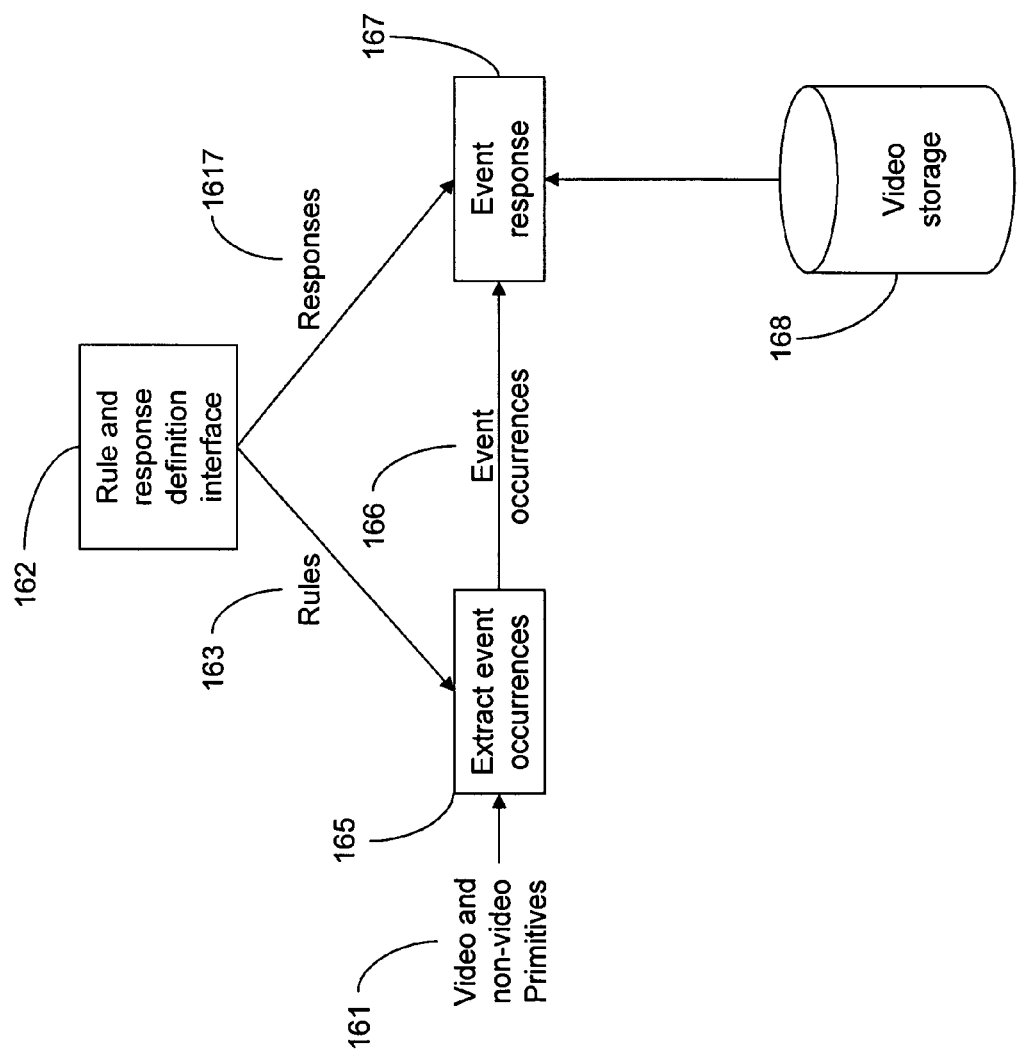
FIG. 16b shows the flow diagram of the event occurrence detection and response subsystem according to an embodiment of the invention.

Referring now to FIG. 16b, once the video, and, if there are other sensors, the non-video primitives 161 are available, the system may detect events. The user tasks the system by defining rules 163 and corresponding responses 164 using the rule and response definition interface 162. The rules are translated into event discriminators, and the system extracts corresponding event occurrences 165. The detected event occurrences 166 trigger user defined responses 167. A response may include a snapshot of a video of the detected event from video storage 168 (which may or may not be the same as video storage 1604 in FIG. 16a). The video storage 168 may be part of the video surveillance system, or it may be a separate recording device 15. Examples of a response may include, but are not necessarily limited to, the following: activating a visual and/or audio alert on a system display; activating a visual and/or audio alarm system at the location; activating a silent alarm; activating a rapid response mechanism; locking a door; contacting a security service; forwarding or streaming data (e.g., image data, video data, video primitives; and/or analyzed data) to another computer system via a network, such as, but not limited to, the Internet; saving such data to a designated computer-readable medium; activating some other sensor or surveillance system; tasking the computer system 11 and/or another computer system; and/or directing the computer system 11 and/or another computer system.

The primitive data can be thought of as data stored in a database. To detect event occurrences in it, an efficient query language is required. Embodiments of the inventive system may include an activity inferencing language, which will be described below.

Traditional relational database querying schemas often follow a Boolean binary tree structure to allow users to create flexible queries on stored data of various types. Leaf nodes are usually of the form "property relationship value," where a property is some key feature of the data (such as time or name); a relationship is usually a numerical operator (">", "<", "=", etc); and a value is a valid state for that property. Branch nodes usually represent unary or binary Boolean logic operators like "and", "or", and "not".

Figures 17A, 17B:
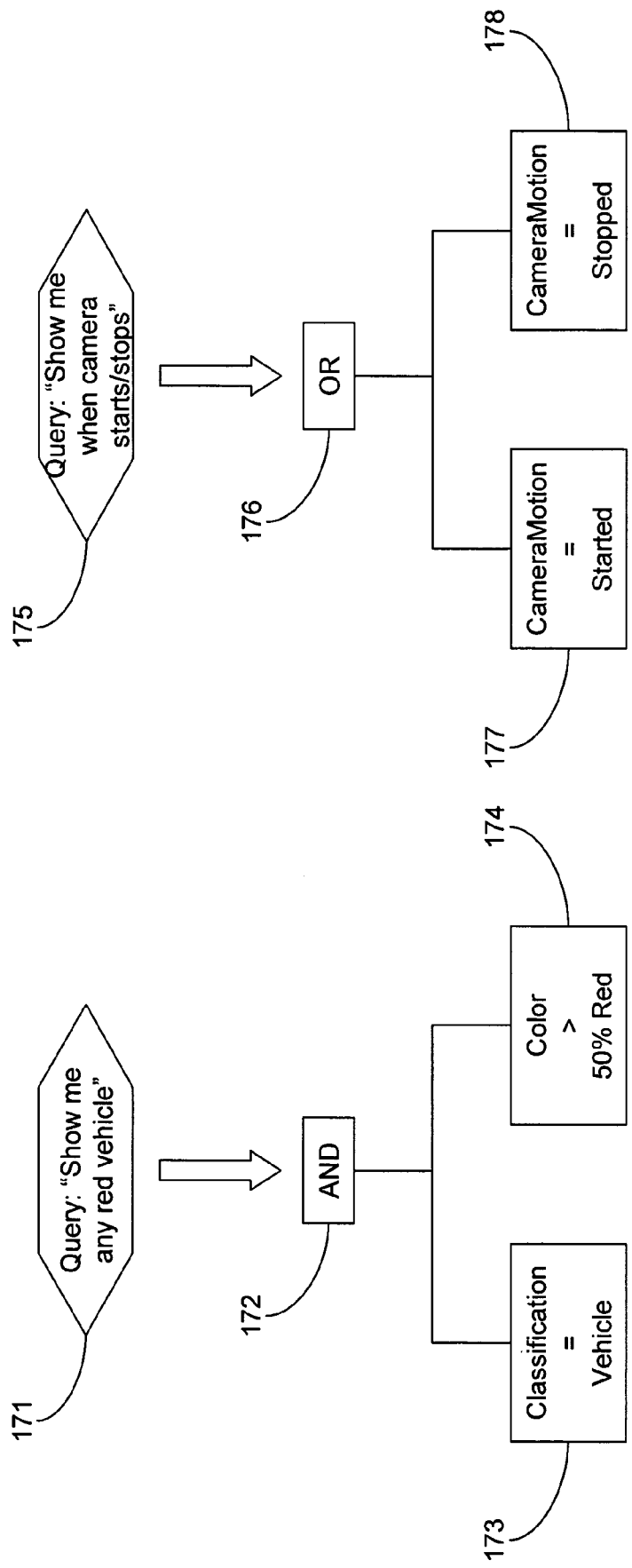
FIG. 17 shows exemplary database queries.

This may form the basis of an activity query formulation schema, as in embodiments of the present invention. In case of a video surveillance application, the properties may be features of the object detected in the video stream, such as size, speed, color, classification (human, vehicle), or the properties may be scene change properties. FIG. 17 gives examples of using such queries. In FIG. 17a, the query, "Show me any red vehicle," 171 is posed. This may be decomposed into two "property relationship value" (or simply "property") queries, testing whether the classification of an object is vehicle 173 and whether its color is predominantly red 174. These two sub-queries can combined with the Boolean operator "and" 172. Similarly, in FIG. 17b, the query, "Show me when a camera starts or stops moving," may be expressed as the Boolean "or" 176 combination of the property sub-queries, "has the camera started moving" 177 and "has the camera stopped moving" 178.

Embodiments of the invention may extend this type of database query schema in two exemplary ways: (1) the basic leaf nodes may be augmented with activity detectors describing spatial activities within a scene; and (2) the Boolean operator branch nodes may be augmented with modifiers specifying spatial, temporal and object interrelationships.

Figure 18C:
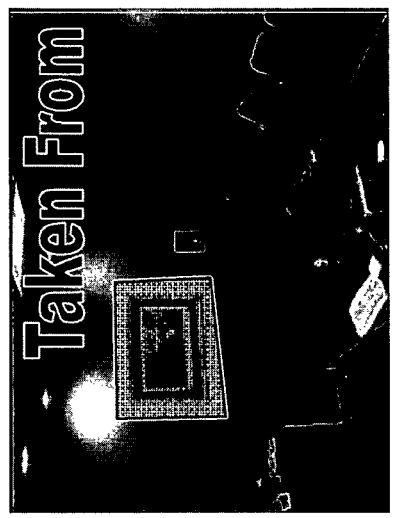
FIG. 18 shows three exemplary activity detectors according to various embodiments of the invention: detecting tripwire crossings (FIG. 18a), loitering (FIG. 18b) and theft (FIG. 18c).
Figure 18B:
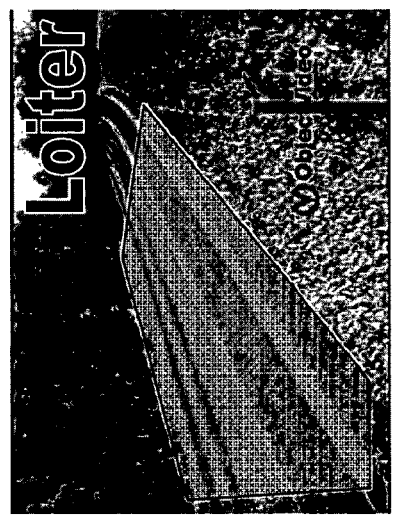
Figure 18A:

Activity detectors correspond to a behavior related to an area of the video scene. They describe how an object might interact with a location in the scene. FIG. 18 illustrates three exemplary activity detectors. FIG. 18a represents the behavior of crossing a perimeter in a particular direction using a virtual video tripwire (for further information about how such virtual video tripwires may be implemented, one may consult, e.g., U.S. Pat. No. 6,696,945). FIG. 18b represents the behavior of loitering for a period of time on a railway track. FIG. 18c represents the behavior of taking something away from a section of wall (for exemplary approaches to how this may be done, one may consult U.S. patent application Ser. No. 10/331,778, entitled, "Video Scene Background Maintenance—Change Detection & Classification," filed on Jan. 30, 2003). Other exemplary activity detectors may include detecting a person falling, detecting a person changing direction or speed, detecting a person entering an area, or detecting a person going in the wrong direction.

Figure 19:
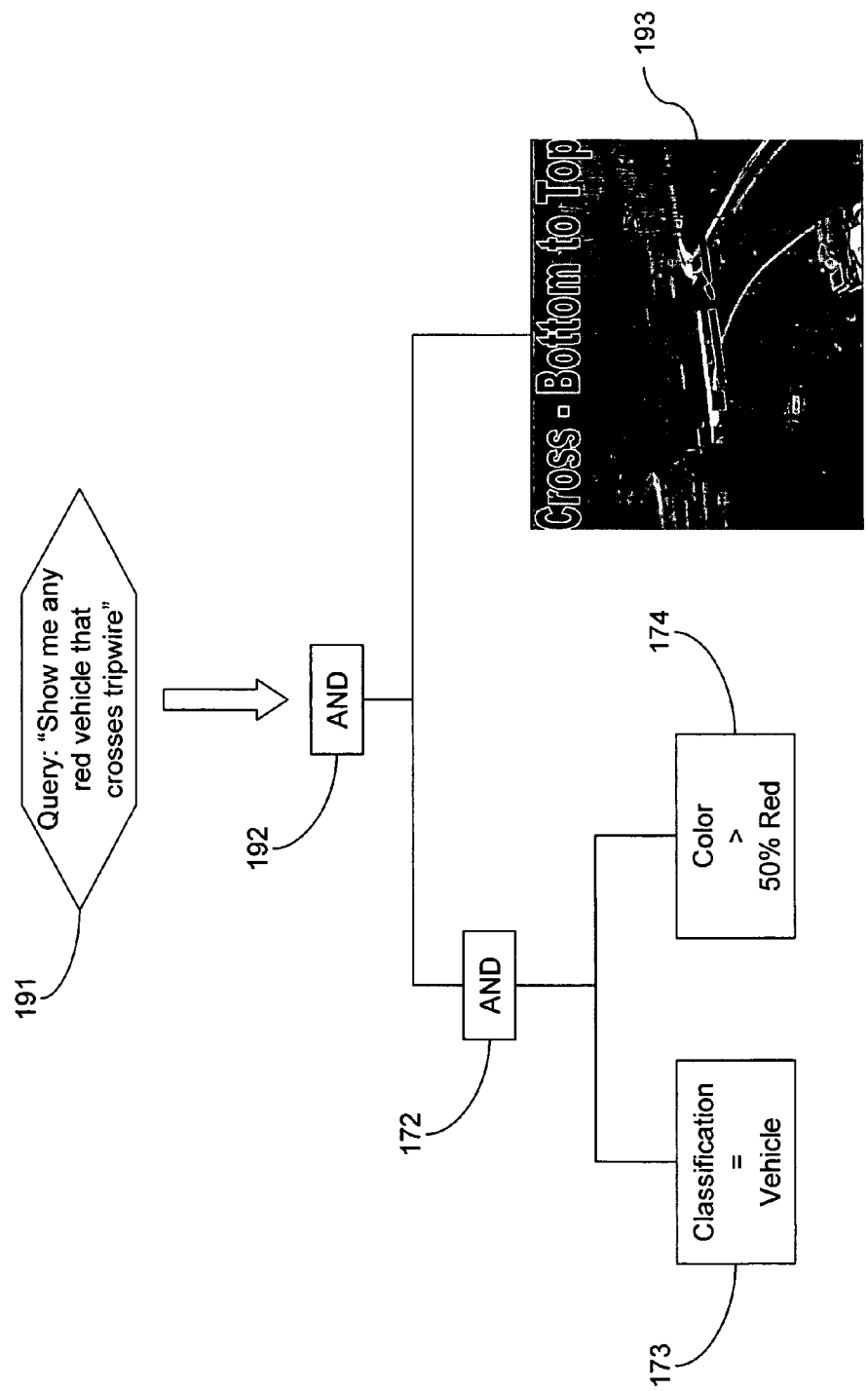
FIG. 19 shows an activity detector query according to an embodiment of the invention.

FIG. 19 illustrates an example of how an activity detector leaf node (here, tripwire crossing) can be combined with simple property queries to detect whether a red vehicle crosses a video tripwire 191. The property queries 172, 173, 174 and the activity detector 193 are combined with a Boolean "and" operator 192.

Combining queries with modified Boolean operators (combinators) may add further flexibility. Exemplary modifiers include spatial, temporal, object, and counter modifiers.

A spatial modifier may cause the Boolean operator to operate only on child activities (i.e., the arguments of the Boolean operator, as shown below a Boolean operator, e.g., in FIG. 19) that are proximate/non-proximate within the scene. For example, "and—within 50 pixels of" may be used to mean that the "and" only applies if the distance between activities is less than 50 pixels.

A temporal modifier may cause the Boolean operator to operate only on child activities that occur within a specified period of time of each other, outside of such a time period, or within a range of times. The time ordering of events may also be specified. For example "and—first within 10 seconds of second" may be used to mean that the "and" only applies if the second child activity occurs not more than 10 seconds after the first child activity.

An object modifier may cause the Boolean operator to operate only on child activities that occur involving the same or different objects. For example "and—involving the same object" may be used to mean that the "and" only applies if the two child activities involve the same specific object.

A counter modifier may cause the Boolean operator to be triggered only if the condition(s) is/are met a prescribed number of times. A counter modifier may generally include a numerical relationship, such as "at least n times," "exactly n times," "at most n times," etc. For example, "or—at least twice" may be used to mean that at least two of the subqueries of the "or" operator have to be true. Another use of the counter modifier may be to implement a rule like "alert if the same person takes at least five items from a shelf."

Figure 20:
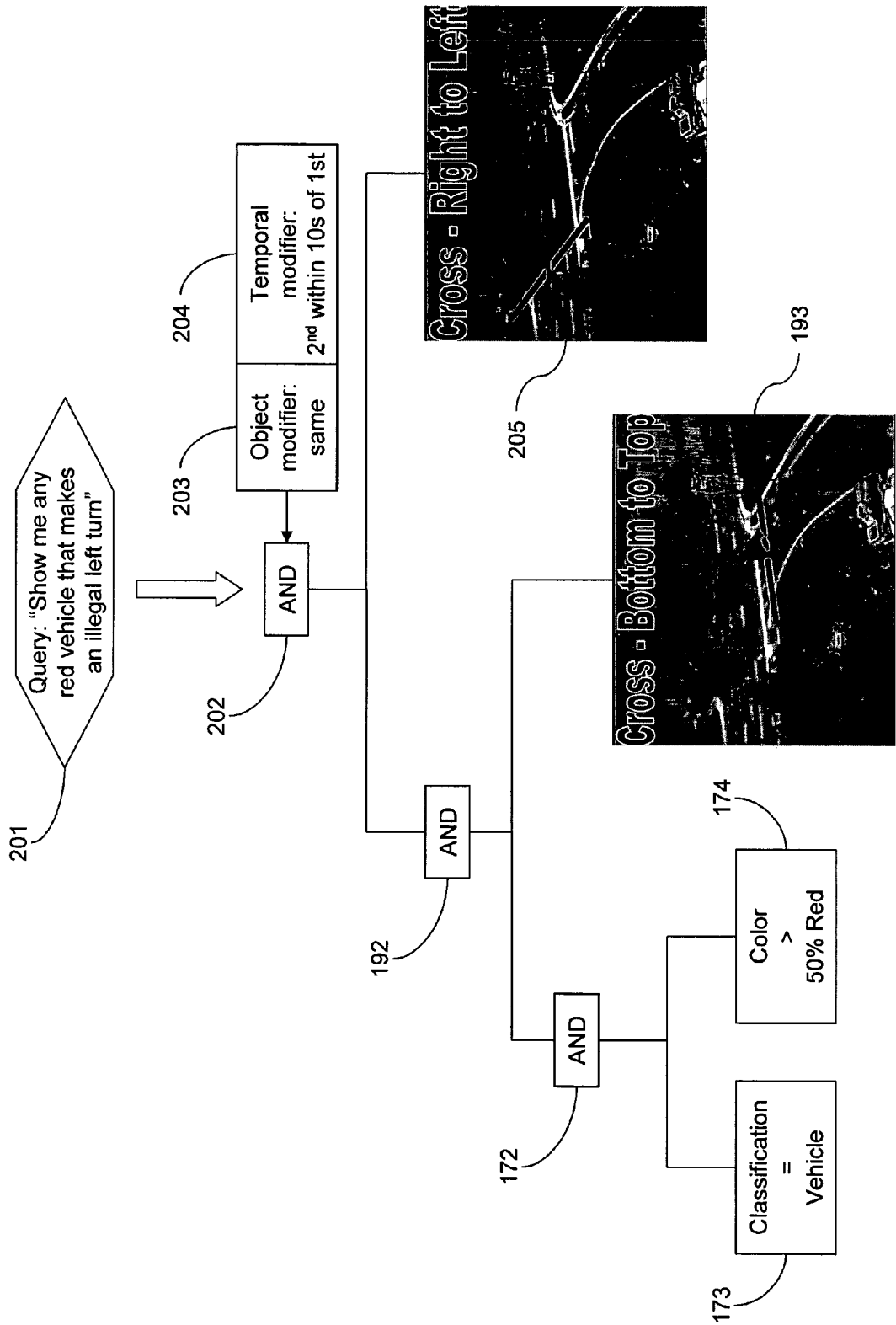
FIG. 20 shows an exemplary query using activity detectors and Boolean operators with modifiers, according to an embodiment of the invention.

FIG. 20 illustrates an example of using combinators. Here, the required activity query is to "find a red vehicle making an illegal left turn" 201. The illegal left turn may be captured through a combination of activity descriptors and modified Boolean operators. One virtual tripwire may be used to detect objects coming out of the side street 193, and another virtual tripwire may be used to detect objects traveling to the left along the road 205. These may be combined by a modified "and" operator 202. The standard Boolean "and" operator guarantees that both activities 193 and 205 have to be detected. The object modifier 203 checks that the same object crossed both tripwires, while the temporal modifier 204 checks that the bottom-to-top tripwire 193 is crossed first, followed by the crossing of the right-to-left tripwire 205 no more than 10 seconds later.

This example also indicates the power of the combinators. Theoretically it is possible to define a separate activity detector for left turn, without relying on simple activity detectors and combinators. However, that detector would be inflexible, making it difficult to accommodate arbitrary turning angles and directions, and it would also be cumbersome to write a separate detector for all potential events. In contrast, using the combinators and simple detectors provides great flexibility.

Other examples of complex activities that can be detected as a combination of simpler ones may include a car parking and a person getting out of the car or multiple people forming a group, tailgating. These combinators can also combine primitives of different types and sources. Examples may include rules such as "show a person inside a room before the lights are turned off;" "show a person entering a door without a preceding card-swipe;" or "show if an area of interest has more objects than expected by an RFID tag reader," i.e., an illegal object without an RFID tag is in the area.

Figure 21A:
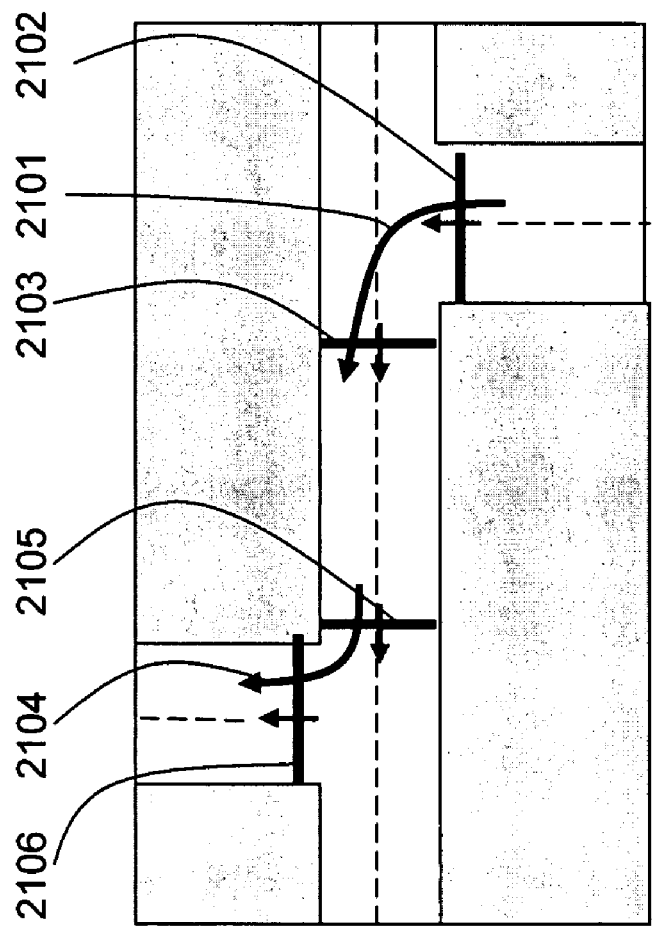
FIGS. 21a and 21b show an exemplary query using multiple levels of combinators, activity detectors, and property queries.
Figure 21B:
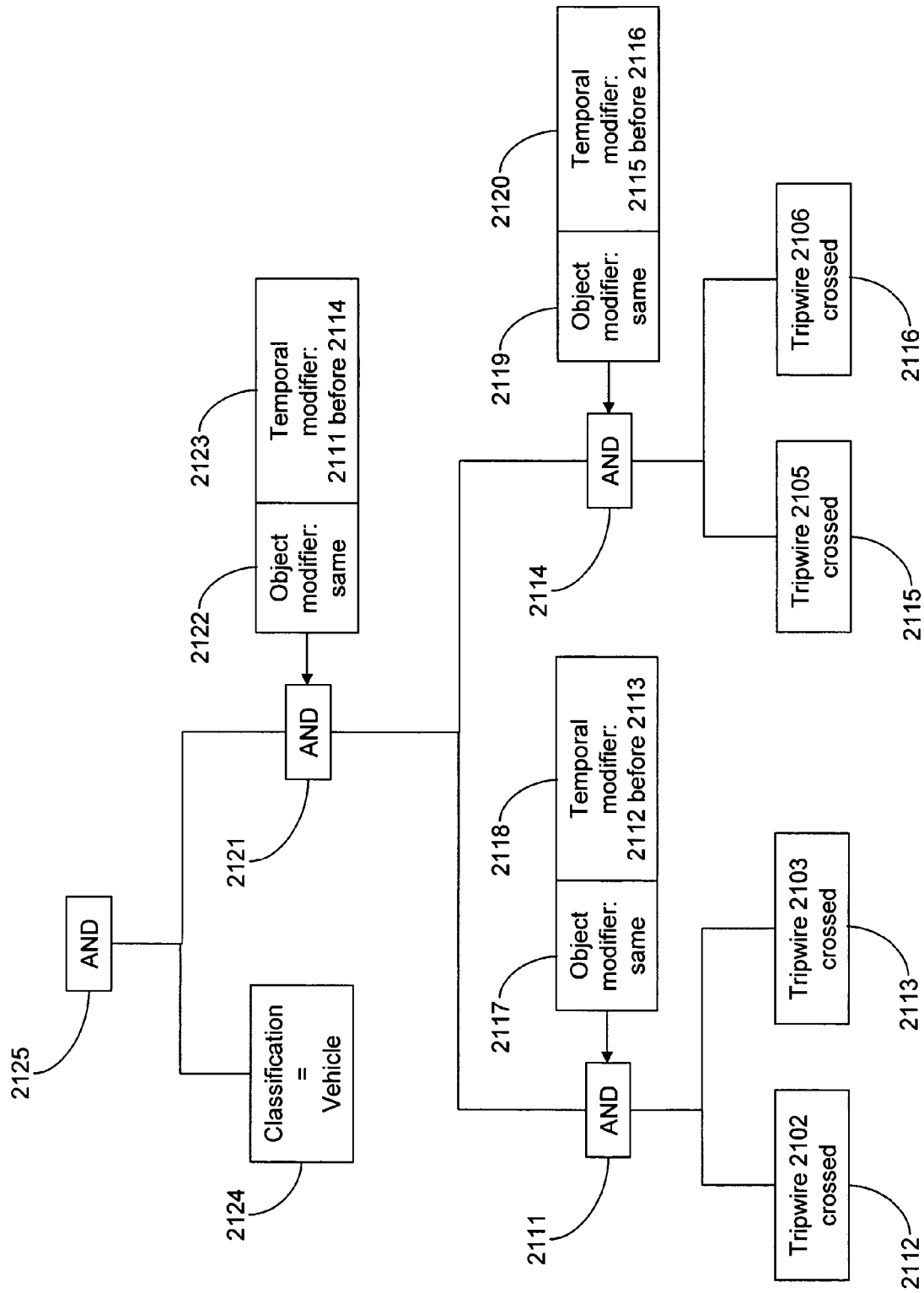

A combinator may combine any number of sub-queries, and it may even combine other combinators, to arbitrary depths. An example, illustrated in FIGS. 21a and 21b, may be a rule to detect if a car turns left 2101 and then turns right 2104. The left turn 2101 may be detected with the directional tripwires 2102 and 2103, while the right turn 2104 with the directional tripwires 2105 and 2106. The left turn may be expressed as the tripwire activity detectors 2112 and 2113, corresponding to tripwires 2102 and 2103, respectively, joined with the "and" combinator 2111 with the object modifier "same" 2117 and temporal modifier "2112 before 2113" 2118. Similarly, the right turn may be expressed as the tripwire activity detectors 2115 and 2116, corresponding to tripwires 2105 and 2106, respectively, joined with the "and" combinator 2114 with the object modifier "same" 2119 and temporal modifier "2115 before 2116" 2120. To detect that the same object turned first left then right, the left turn detector 2111 and the right turn detector 2114 are joined with the "and" combinator 2121 with the object modifier "same" 2122 and temporal modifier "2111 before 2114" 2123. Finally, to ensure that the detected object is a vehicle, a Boolean "and" operator 2125 is used to combine the left-and-right-turn detector 2121 and the property query 2124.

All these detectors may optionally be combined with temporal attributes. Examples of a temporal attribute include: every 15 minutes; between 9:00 pm and 6:30 am; less than 5 minutes; longer than 30 seconds; and over the weekend.

Figure 4:
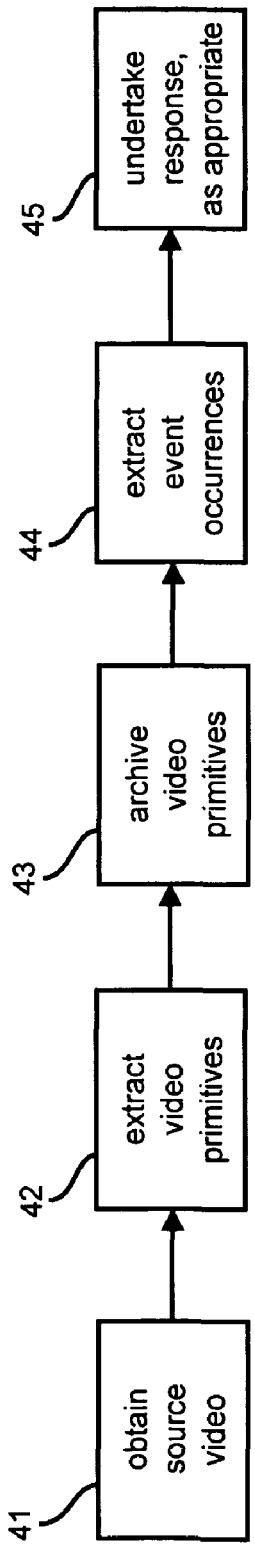
FIG. 4 illustrates a flow diagram for operating the video surveillance system.

In block 24 of FIG. 2, the video surveillance system is operated. The video surveillance system of the invention operates automatically, detects and archives video primitives of objects in the scene, and detects event occurrences in real time using event discriminators. In addition, action is taken in real time, as appropriate, such as activating alarms, generating reports, and generating output. The reports and output can be displayed and/or stored locally to the system or elsewhere via a network, such as the Internet. FIG. 4 illustrates a flow diagram for operating the video surveillance system.

In block 41, the computer system 11 obtains source video from the video sensors 14 and/or the video recorders 15.

In block 42, video primitives are extracted in real time from the source video. As an option, non-video primitives can be obtained and/or extracted from one or more other sensors 17 and used with the invention. The extraction of video primitives is illustrated with FIG. 5.

Figure 5:
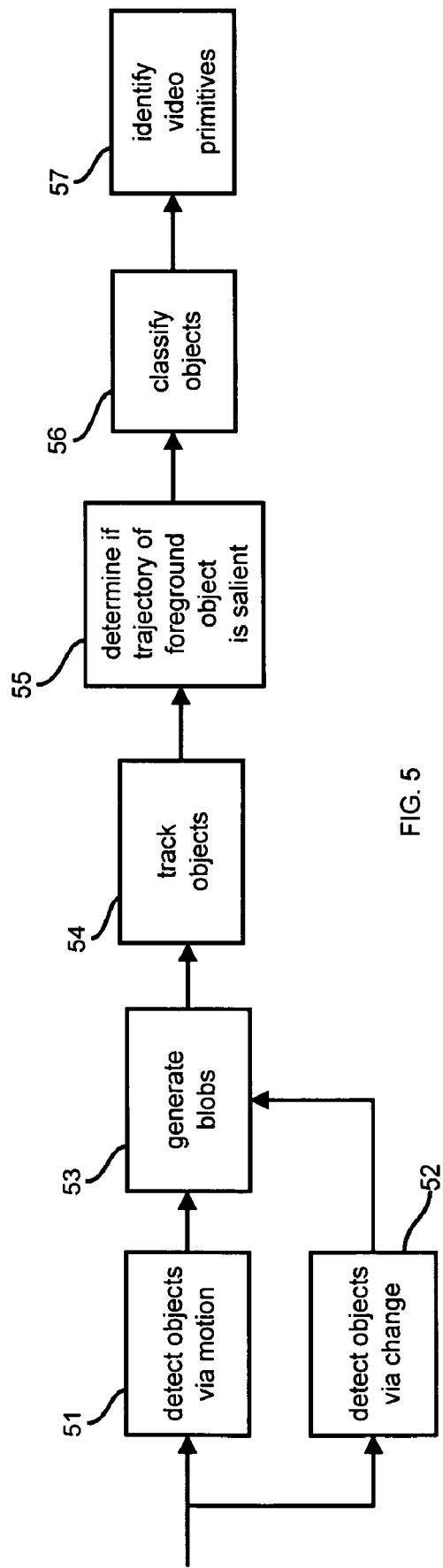
FIG. 5 illustrates a flow diagram for extracting video primitives for the video surveillance system.

FIG. 5 illustrates a flow diagram for extracting video primitives for the video surveillance system. Blocks 51 and 52 operate in parallel and can be performed in any order or concurrently. In block 51, objects are detected via movement. Any motion detection algorithm for detecting movement between frames at the pixel level can be used for this block. As an example, the three frame differencing technique can be used, which is discussed in {1}. The detected objects are forwarded to block 53.

In block 52, objects are detected via change. Any change detection algorithm for detecting changes from a background model can be used for this block. An object is detected in this block if one or more pixels in a frame are deemed to be in the foreground of the frame because the pixels do not conform to a background model of the frame. As an example, a stochastic background modeling technique, such as dynamically adaptive background subtraction, can be used, which is described in {1} and U.S. patent application Ser. No. 09/694,712 filed Oct. 24, 2000. The detected objects are forwarded to block 53.

The motion detection technique of block 51 and the change detection technique of block 52 are complimentary techniques, where each technique advantageously addresses deficiencies in the other technique. As an option, additional and/or alternative detection schemes can be used for the techniques discussed for blocks 51 and 52. Examples of an additional and/or alternative detection scheme include the following: the Pfinder detection scheme for finding people as described in {8}; a skin tone detection scheme; a face detection scheme; and a model-based detection scheme. The results of such additional and/or alternative detection schemes are provided to block 53.

As an option, if the video sensor 14 has motion (e.g., a video camera that sweeps, zooms, and/or translates), an additional block can be inserted before blocks between blocks 51 and 52 to provide input to blocks 51 and 52 for video stabilization. Video stabilization can be achieved by affine or projective global motion compensation. For example, image alignment described in U.S. patent application Ser. No. 09/609,919, filed Jul. 3, 2000, now U.S. Pat. No. 6,738,424, which is incorporated herein by reference, can be used to obtain video stabilization.

In block 53, blobs are generated. In general, a blob is any object in a frame. Examples of a blob include: a moving object, such as a person or a vehicle; and a consumer product, such as a piece of furniture, a clothing item, or a retail shelf item. Blobs are generated using the detected objects from blocks 51 and 52. Any technique for generating blobs can be used for this block. An exemplary technique for generating blobs from motion detection and change detection uses a connected components scheme. For example, the morphology and connected components algorithm can be used, which is described in {1}.

In block 54, blobs are tracked. Any technique for tracking blobs can be used for this block. For example, Kalman filtering or the CONDENSATION algorithm can be used. As another example, a template matching technique, such as described in {1}, can be used. As a further example, a multi-hypothesis Kalman tracker can be used, which is described in {5}. As yet another example, the frame-to-frame tracking technique described in U.S. patent application Ser. No. 09/694,712 filed Oct. 24, 2000, can be used. For the example of a location being a grocery store, examples of objects that can be tracked include moving people, inventory items, and inventory moving appliances, such as shopping carts or trolleys.

As an option, blocks 51-54 can be replaced with any detection and tracking scheme, as is known to those of ordinary skill. An example of such a detection and tracking scheme is described in {11}.

In block 55, each trajectory of the tracked objects is analyzed to determine if the trajectory is salient. If the trajectory is insalient, the trajectory represents an object exhibiting unstable motion or represents an object of unstable size or color, and the corresponding object is rejected and is no longer analyzed by the system. If the trajectory is salient, the trajectory represents an object that is potentially of interest. A trajectory is determined to be salient or insalient by applying a salience measure to the trajectory. Techniques for determining a trajectory to be salient or insalient are described in {13} and {18}.

In block 56, each object is classified. The general type of each object is determined as the classification of the object. Classification can be performed by a number of techniques, and examples of such techniques include using a neural network classifier {14} and using a linear discriminatant classifier {14}. Examples of classification are the same as those discussed for block 23.

In block 57, video primitives are identified using the information from blocks 51-56 and additional processing as necessary. Examples of video primitives identified are the same as those discussed for block 23. As an example, for size, the system can use information obtained from calibration in block 22 as a video primitive. From calibration, the system has sufficient information to determine the approximate size of an object. As another example, the system can use velocity as measured from block 54 as a video primitive.

In block 43, the video primitives from block 42 are archived. The video primitives can be archived in the computer-readable medium 13 or another computer-readable medium. Along with the video primitives, associated frames or video imagery from the source video can be archived. This archiving step is optional; if the system is to be used only for real-time event detection, the archiving step can be skipped.

In block 44, event occurrences are extracted from the video primitives using event discriminators. The video primitives are determined in block 42, and the event discriminators are determined from tasking the system in block 23. The event discriminators are used to filter the video primitives to determine if any event occurrences occurred. For example, an event discriminator can be looking for a "wrong way" event as defined by a person traveling the "wrong way" into an area between 9:00 a.m. and 5:00 p.m. The event discriminator checks all video primitives being generated according to FIG. 5 and determines if any video primitives exist which have the following properties: a timestamp between 9:00 a.m. and 5:00 p.m., a classification of "person" or "group of people", a position inside the area, and a "wrong" direction of motion. The event discriminators may also use other types of primitives, as discussed above, and/or combine video primitives from multiple video sources to detect event occurrences.

Figure 6:
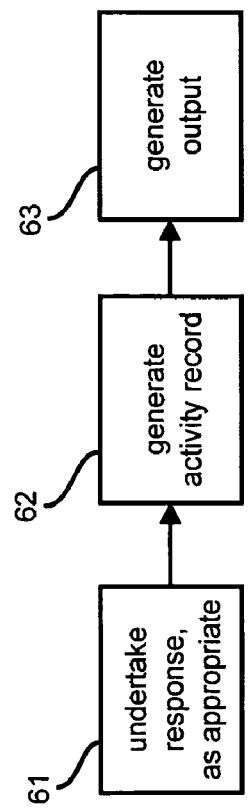
FIG. 6 illustrates a flow diagram for taking action with the video surveillance system.

In block 45, action is taken for each event occurrence extracted in block 44, as appropriate. FIG. 6 illustrates a flow diagram for taking action with the video surveillance system.

In block 61, responses are undertaken as dictated by the event discriminators that detected the event occurrences. The responses, if any, are identified for each event discriminator in block 162.

In block 62, an activity record is generated for each event occurrence that occurred. The activity record includes, for example: details of a trajectory of an object; a time of detection of an object; a position of detection of an object, and a description or definition of the event discriminator that was employed. The activity record can include information, such as video primitives, needed by the event discriminator. The activity record can also include representative video or still imagery of the object(s) and/or area(s) involved in the event occurrence. The activity record is stored on a computer-readable medium.

In block 63, output is generated. The output is based on the event occurrences extracted in block 44 and a direct feed of the source video from block 41. The output is stored on a computer-readable medium, displayed on the computer system 11 or another computer system, or forwarded to another computer system. As the system operates, information regarding event occurrences is collected, and the information can be viewed by the operator at any time, including real time. Examples of formats for receiving the information include: a display on a monitor of a computer system; a hard copy; a computer-readable medium; and an interactive web page.

The output can include a display from the direct feed of the source video from block 41 transmitted either via analog video transmission means or via network video streaming. For example, the source video can be displayed on a window of the monitor of a computer system or on a closed-circuit monitor. Further, the output can include source video marked up with graphics to highlight the objects and/or areas involved in the event occurrence. If the system is operating in forensic analysis mode, the video may come from the video recorder.

The output can include one or more reports for an operator based on the requirements of the operator and/or the event occurrences. Examples of a report include: the number of event occurrences which occurred; the positions in the scene in which the event occurrence occurred; the times at which the event occurrences occurred; representative imagery of each event occurrence; representative video of each event occurrence; raw statistical data; statistics of event occurrences (e.g., how many, how often, where, and when); and/or human-readable graphical displays.

Figure 14:
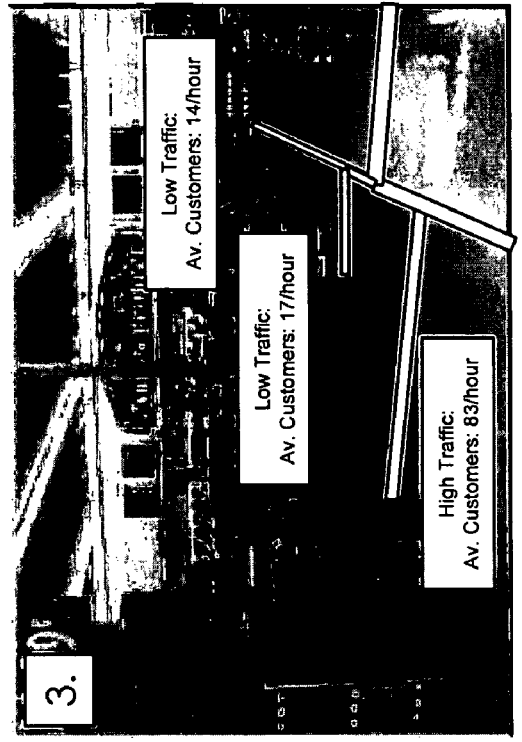
Figure 13:
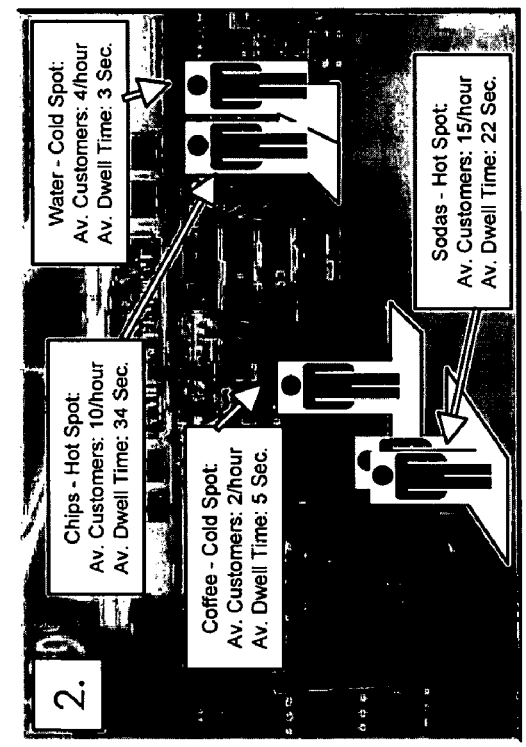
Figure 15:
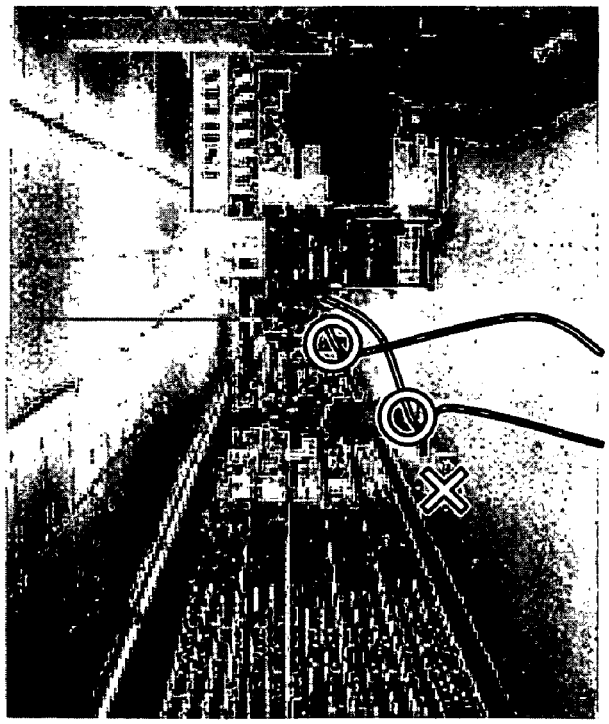

FIGS. 13 and 14 illustrate an exemplary report for the aisle in the grocery store of FIG. 15. In FIGS. 13 and 14, several areas are identified in block 22 and are labeled accordingly in the images. The areas in FIG. 13 match those in FIG. 12, and the areas in FIG. 14 are different ones. The system is tasked to look for people who stop in the area.

In FIG. 13, the exemplary report is an image from a video marked-up to include labels, graphics, statistical information, and an analysis of the statistical information. For example, the area identified as coffee has statistical information of an average number of customers in the area of 2/hour and an average dwell time in the area as 5 seconds. The system determined this area to be a "cold" region, which means there is not much commercial activity through this region. As another example, the area identified as sodas has statistical information of an average number of customers in the area of 15/hour and an average dwell time in the area as 22 seconds. The system determined this area to be a "hot" region, which means there is a large amount of commercial activity in this region.

In FIG. 14, the exemplary report is an image from a video marked-up to include labels, graphics, statistical information, and an analysis of the statistical information. For example, the area at the back of the aisle has average number of customers of 14/hour and is determined to have low traffic. As another example, the area at the front of the aisle has average number of customers of 83/hour and is determined to have high traffic.

For either FIG. 13 or FIG. 14, if the operator desires more information about any particular area or any particular area, a point-and-click interface allows the operator to navigate through representative still and video imagery of regions and/or activities that the system has detected and archived.

FIG. 15 illustrates another exemplary report for an aisle in a grocery store. The exemplary report includes an image from a video marked-up to include labels and trajectory indications and text describing the marked-up image. The system of the example is tasked with searching for a number of areas: length, position, and time of a trajectory of an object; time and location an object was immobile; correlation of trajectories with areas, as specified by the operator; and classification of an object as not a person, one person, two people, and three or more people.

The video image of FIG. 15 is from a time period where the trajectories were recorded. Of the three objects, two objects are each classified as one person, and one object is classified as not a person. Each object is assigned a label, namely Person ID 1032, Person ID 1033, and Object ID 32001. For Person ID 1032, the system determined the person spent 52 seconds in the area and 18 seconds at the position designated by the circle. For Person ID 1033, the system determined the person spent 1 minute and 8 seconds in the area and 12 seconds at the position designated by the circle. The trajectories for Person ID 1032 and Person ID 1033 are included in the marked-up image. For Object ID 32001, the system did not further analyze the object and indicated the position of the object with an X.

Referring back to block 22 in FIG. 2, calibration can be (1) manual, (2) semi-automatic using imagery from a video sensor or a video recorder, or (3) automatic using imagery from a video sensor or a video recorder. If imagery is required, it is assumed that the source video to be analyzed by the computer system 11 is from a video sensor that obtained the source video used for calibration.

For manual calibration, the operator provides to the computer system 1 the orientation and internal parameters for each of the video sensors 14 and the placement of each video sensor 14 with respect to the location. The computer system 11 can optionally maintain a map of the location, and the placement of the video sensors 14 can be indicated on the map. The map can be a two-dimensional or a three-dimensional representation of the environment. In addition, the manual calibration provides the system with sufficient information to determine the approximate size and relative position of an object.

Alternatively, for manual calibration, the operator can mark up a video image from the sensor with a graphic representing the appearance of a known-sized object, such as a person. If the operator can mark up an image in at least two different locations, the system can infer approximate camera calibration information.

For semi-automatic and automatic calibration, no knowledge of the camera parameters or scene geometry is required. From semi-automatic and automatic calibration, a lookup table is generated to approximate the size of an object at various areas in the scene, or the internal and external camera calibration parameters of the camera are inferred.

For semi-automatic calibration, the video surveillance system is calibrated using a video source combined with input from the operator. A single person is placed in the field of view of the video sensor to be semi-automatic calibrated. The computer system 11 receives source video regarding the single person and automatically infers the size of person based on this data. As the number of locations in the field of view of the video sensor that the person is viewed is increased, and as the period of time that the person is viewed in the field of view of the video sensor is increased, the accuracy of the semi-automatic calibration is increased.

FIG. 7 illustrates a flow diagram for semi-automatic calibration of the video surveillance system. Block 71 is the same as block 41, except that a typical object moves through the scene at various trajectories. The typical object can have various velocities and be stationary at various positions. For example, the typical object moves as close to the video sensor as possible and then moves as far away from the video sensor as possible. This motion by the typical object can be repeated as necessary.

Blocks 72-75 are the same as blocks 51-54, respectively.

In block 76, the typical object is monitored throughout the scene. It is assumed that the only (or at least the most) stable object being tracked is the calibration object in the scene (i.e., the typical object moving through the scene). The size of the stable object is collected for every point in the scene at which it is observed, and this information is used to generate calibration information.

Figure 11:
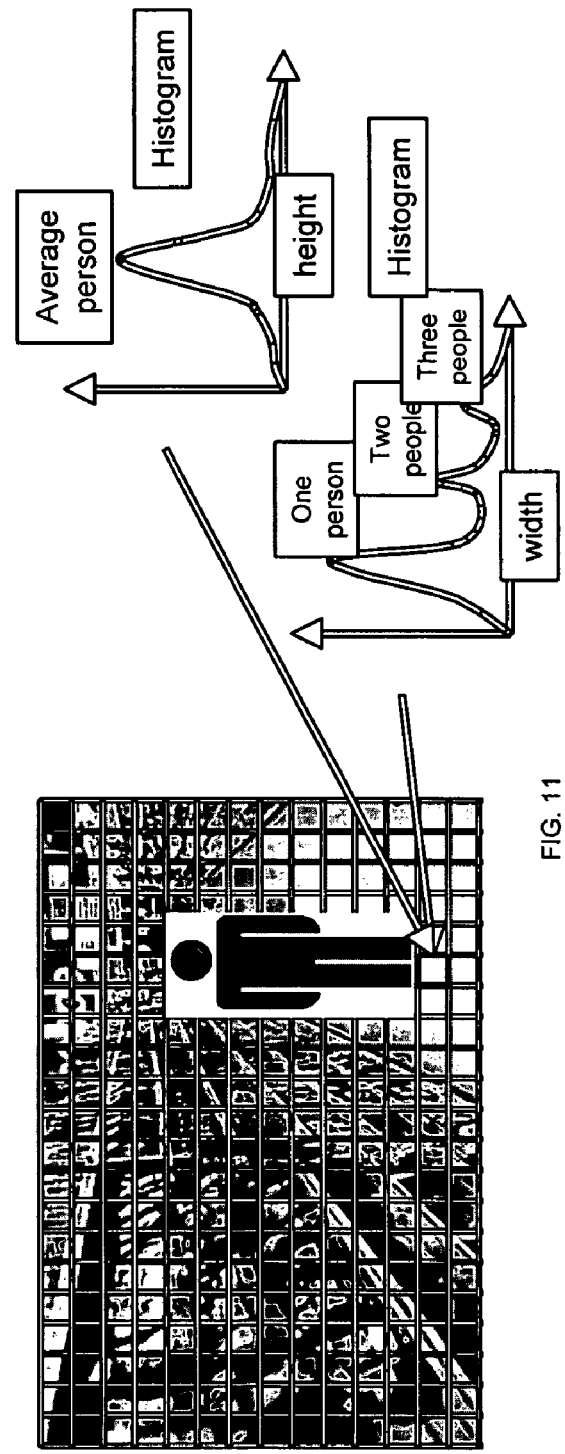

In block 77, the size of the typical object is identified for different areas throughout the scene. The size of the typical object is used to determine the approximate sizes of similar objects at various areas in the scene. With this information, a lookup table is generated matching typical apparent sizes of the typical object in various areas in the image, or internal and external camera calibration parameters are inferred. As a sample output, a display of stick-sized figures in various areas of the image indicate what the system determined as an appropriate height. Such a stick-sized figure is illustrated in FIG. 11.

For automatic calibration, a learning phase is conducted where the computer system 11 determines information regarding the location in the field of view of each video sensor. During automatic calibration, the computer system 11 receives source video of the location for a representative period of time (e.g., minutes, hours or days) that is sufficient to obtain a statistically significant sampling of objects typical to the scene and thus infer typical apparent sizes and locations.

FIG. 8 illustrates a flow diagram for automatic calibration of the video surveillance system. Blocks 81-86 are the same as blocks 71-76 in FIG. 7.

In block 87, trackable regions in the field of view of the video sensor are identified. A trackable region refers to a region in the field of view of a video sensor where an object can be easily and/or accurately tracked. An untrackable region refers to a region in the field of view of a video sensor where an object is not easily and/or accurately tracked and/or is difficult to track. An untrackable region can be referred to as being an unstable or insalient region. An object may be difficult to track because the object is too small (e.g., smaller than a predetermined threshold), appear for too short of time (e.g., less than a predetermined threshold), or exhibit motion that is not salient (e.g., not purposeful). A trackable region can be identified using, for example, the techniques described in {13}.

Figure 10:
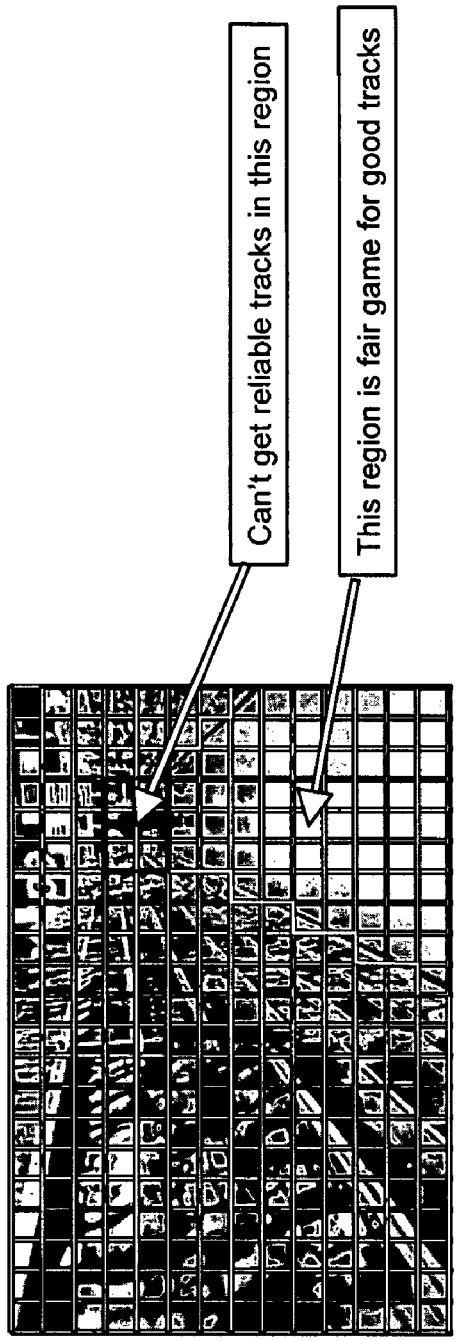
FIGS. 10-15 illustrate examples of the video surveillance system of the invention applied to monitoring a grocery store.

FIG. 10 illustrates trackable regions determined for an aisle in a grocery store. The area at the far end of the aisle is determined to be insalient because too many confusers appear in this area. A confuser refers to something in a video that confuses a tracking scheme. Examples of a confuser include: leaves blowing; rain; a partially occluded object; and an object that appears for too short of time to be tracked accurately. In contrast, the area at the near end of the aisle is determined to be salient because good tracks are determined for this area.

In block 88, the sizes of the objects are identified for different areas throughout the scene. The sizes of the objects are used to determine the approximate sizes of similar objects at various areas in the scene. A technique, such as using a histogram or a statistical median, is used to determine the typical apparent height and width of objects as a function of location in the scene. In one part of the image of the scene, typical objects can have a typical apparent height and width.

With this information, a lookup table is generated matching typical apparent sizes of objects in various areas in the image, or the internal and external camera calibration parameters can be inferred.

FIG. 11 illustrates identifying typical sizes for typical objects in the aisle of the grocery store from FIG. 10. Typical objects are assumed to be people and are identified by a label accordingly. Typical sizes of people are determined through plots of the average height and average width for the people detected in the salient region. In the example, plot A is determined for the average height of an average person, and plot B is determined for the average width for one person, two people, and three people.

For plot A, the x-axis depicts the height of the blob in pixels, and the y-axis depicts the number of instances of a particular height, as identified on the x-axis, that occur. The peak of the line for plot A corresponds to the most common height of blobs in the designated region in the scene and, for this example, the peak corresponds to the average height of a person standing in the designated region.

Assuming people travel in loosely knit groups, a similar graph to plot A is generated for width as plot B. For plot B, the x-axis depicts the width of the blobs in pixels, and the y-axis depicts the number of instances of a particular width, as identified on the x-axis, that occur. The peaks of the line for plot B correspond to the average width of a number of blobs. Assuming most groups contain only one person, the largest peak corresponds to the most common width, which corresponds to the average width of a single person in the designated region. Similarly, the second largest peak corresponds to the average width of two people in the designated region, and the third largest peak corresponds to the average width of three people in the designated region.

Figure 9:
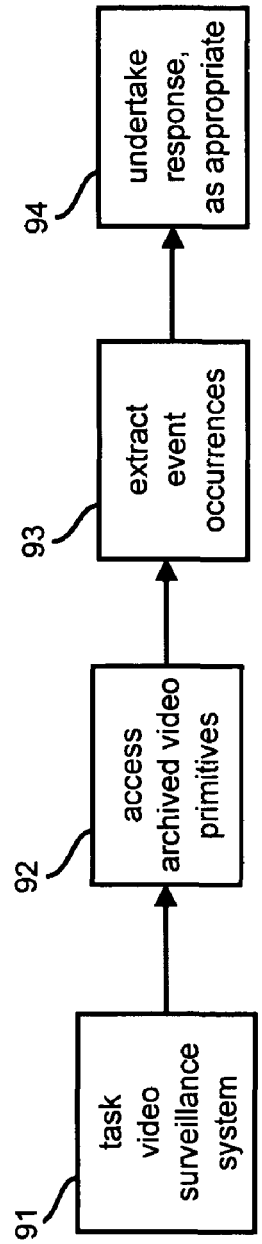
FIG. 9 illustrates an additional flow diagram for the video surveillance system of the invention.

FIG. 9 illustrates an additional flow diagram for the video surveillance system of the invention. In this additional embodiment, the system analyzes archived video primitives with event discriminators to generate additional reports, for example, without needing to review the entire source video. Anytime after a video source has been processed according to the invention, video primitives for the source video are archived in block 43 of FIG. 4. The video content can be reanalyzed with the additional embodiment in a relatively short time because only the video primitives are reviewed and because the video source is not reprocessed. This provides a great efficiency improvement over current state-of-the-art systems because processing video imagery data is extremely computationally expensive, whereas analyzing the small-sized video primitives abstracted from the video is extremely computationally cheap. As an example, the following event discriminator can be generated: "The number of people stopping for more than 10 minutes in area A in the last two months." With the additional embodiment, the last two months of source video does not need to be reviewed. Instead, only the video primitives from the last two months need to be reviewed, which is a significantly more efficient process.

Block 91 is the same as block 23 in FIG. 2.

In block 92, archived video primitives are accessed. The video primitives are archived in block 43 of FIG. 4.

Blocks 93 and 94 are the same as blocks 44 and 45 in FIG. 4.

As an exemplary application, the invention can be used to analyze retail market space by measuring the efficacy of a retail display. Large sums of money are injected into retail displays in an effort to be as eye-catching as possible to promote sales of both the items on display and subsidiary items. The video surveillance system of the invention can be configured to measure the effectiveness of these retail displays.

For this exemplary application, the video surveillance system is set up by orienting the field of view of a video sensor towards the space around the desired retail display. During tasking, the operator selects an area representing the space around the desired retail display. As a discriminator, the operator defines that he or she wishes to monitor people-sized objects that enter the area and either exhibit a measurable reduction in velocity or stop for an appreciable amount of time.

After operating for some period of time, the video surveillance system can provide reports for market analysis. The reports can include: the number of people who slowed down around the retail display; the number of people who stopped at the retail display; the breakdown of people who were interested in the retail display as a function of time, such as how many were interested on weekends and how many were interested in evenings; and video snapshots of the people who showed interest in the retail display. The market research information obtained from the video surveillance system can be combined with sales information from the store and customer records from the store to improve the analysts understanding of the efficacy of the retail display.

The embodiments and examples discussed herein are non-limiting examples.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A video system comprising:
a first processor which analyzes a video to determine attributes of objects detected in the video, the first processor being in communication with a first communications link to transfer the determined attributes over the communications link; and
a second processor, separate from the first processor, in communication with the first communications link to receive the determined attributes transferred from the first processor over the first communications link, which determines a first event that is not one of the determined attributes by analyzing a combination of the received determined attributes and which provides, in response to a determination of the first event, at least one of an alert to a user, information for a report, and an instruction for taking an action,
wherein the first processor determines attributes independent of a selection of the first event by the second processor, and
wherein the second processor determines the first event without reprocessing the video analyzed by the first processor.

2. The video system of claim 1, wherein the first communications link comprises a network.

3. The video system of claim 1, wherein the second processor determines the first event by analyzing only the attributes transferred by the communications link.

4. The video system of claim 1, wherein the second processor analyzes the attributes to detect the first event in real time.

5. The video system of claim 1, further comprising:
a third processor, separate from the first processor and second processor, in communication with the first processor over a second communications link, the third processor configured to determine a second event that is not one of the determined attributes by analyzing a combination of the attributes transferred by the second communications link,
wherein the second processor determines the first event independent from the determination of the second event by the third processor and the third processor determines the second event independent from the determination of the first event by the second processor.

6. A video system, comprising:
an input in communication with a communications channel;
a processor configured to receive from the input a stream of detected attributes received over the communications channel, the attributes being attributes of one or more objects detected in a video, the processor configured to determine an event that is not one of the detected attributes by analyzing a combination of the received attributes and configured to provide, upon a determination of the event, at least one of an alert to a user, information for a report and an instruction for taking an action,
wherein the attributes received over the communications channel are independent of the event to be determined by the processor, and
wherein the processor is configured to determine the event without reprocessing the video.

7. The video system of claim 6, wherein the communications channel comprises a network.

8. The video system of claim 6, wherein the processor is operable to determine an event by analyzing only attributes of the received stream of attributes.

9. A method of detecting an event from a video, comprising:
receiving a stream of detected attributes over a communications channel, the detected attributes representing attributes of an object previously detected in the video at a remote location;
performing an analysis of a combination of the detected attributes to detect an event that is not one of the detected attributes without reprocessing the video,
upon detecting the event, providing at least one of an alert to a user, information for a report and an instruction for taking an action,
wherein the detected attributes received in the stream of attributes are independent of a selection of the event to be detected.

10. The method of claim 9, wherein the communications channel comprises a network.

11. The method of claim 9, wherein the analysis performed to detect an event determines an event by analyzing only attributes received in the stream of detected attributes.

12. A method comprising:
analyzing a video to detect an object;
creating a stream of attributes at a first location by determining attributes of the detected object by analyzing the video;
transmitting the stream of attributes to a second location removed from the first location for subsequent analysis,
wherein the stream of attributes are transmitted to the second location over a communications channel, and
wherein the stream of attributes is sufficient to allow the subsequent analysis to detect an event of the video to provide at least one of an alert to a user, information for a report and an instruction for taking an action, the event not being one of the determined attributes, wherein the stream of attributes is sufficient to allow detection of the event that is not one of the determined attributes without reprocessing the video of the first location.

13. The method of claim 12, further comprising: obtaining the video with a video capture apparatus.

14. The method of claim 12, wherein the communications channel comprises a network.

15. The method of claim 12, wherein the attributes of the stream of attributes are created independently of the subsequent analysis.

16. The method of claim 12, wherein the stream of attributes is sufficient to allow detection of an event that is not one of the determined attributes by analyzing a combination of the attributes.

17. The method of claim 12, wherein the stream of attributes is transmitted over a communications channel without detection of an event at the first location.

18. A video device, comprising:

a processor at a first location which analyzes a video to detect an object and to determine attributes of the object detected in the video;

an output configured to transmit the attributes determined by the processor over a communications link, wherein the output is configured to transmit the attributes to a second location removed from the processor for a subsequent analysis of a combination of the attributes at the second location, wherein the processor determines attributes independently of a subsequent analysis of a combination of attributes to determine an event that is not one of the determined attributes, and wherein the attributes are sufficient to allow detection of an event to provide at least one of an alert to a user, information for a report and an instruction for taking an action, the event not being one of the determined attributes and being determinable by analyzing the combination of the attributes, wherein the attributes are sufficient to allow detection of an event without reprocessing the video of the first location.

19. The video device of claim 18, further comprising:

a video capture apparatus to provide the video to the processor.

20. The video device of claim 18, wherein the output transmits a stream of the detected attributes over the communications link.

21. The video device of claim 20, wherein the communications link comprises a network.

22. The video device of claim 18, wherein the attributes are transmitted over the communications channel without detection of an event by the processor.

* * * * *

(12) EX PARTE REEXAMINATION CERTIFICATE (10201st)
United States Patent
Venetianer et al.

(10) Number: US 7,868,912 C1
(45) Certificate Issued: Jun. 25, 2014

(54) VIDEO SURVEILLANCE SYSTEM EMPLOYING VIDEO PRIMITIVES

(75) Inventors: Peter L. Venetianer, McLean, VA (US); Alan J. Lipton, Herndon, VA (US); Andrew J. Chosak, Arlington, VA (US); Matthew F. Frazier, Arlington, VA (US); Niels Haering, Reston, VA (US); Gary W. Myers, Ashburn, VA (US); Weihong Yin, Herndon, VA (US); Zhong Zhang, Herndon, VA (US)

(73) Assignee: ObjectVideo, Inc., Reston, VA (US)

Reexamination Request:
No. 90/012,878, May 24, 2013

Reexamination Certificate for:
Patent No.: 7,868,912
Issued: Jan. 11, 2011
Appl. No.: 11/098,385
Filed: Apr. 5, 2005

Related U.S. Application Data

(63) Continuation-in-part of application No. 11/057,154, filed on Feb. 15, 2005, which is a continuation-in-part of application No. 09/987,707, filed on Nov. 15, 2001, now abandoned, which is a continuation-in-part of application No. 09/694,712, filed on Oct. 24, 2000, now Pat. No. 6,954,498.

(51) Int. Cl.
*H04N 7/18* (2006.01)

(52) U.S. Cl.
USPC .......................................................... 348/143

(58) Field of Classification Search
None
See application file for complete search history.

(56) References Cited

To view the complete listing of prior art documents cited during the proceeding for Reexamination Control Number 90/012,878, please refer to the USPTO's public Patent Application Information Retrieval (PAIR) system under the Display References tab.

*Primary Examiner* — Adam L Basehoar

(57) ABSTRACT

A video surveillance system extracts video primitives and extracts event occurrences from the video primitives using event discriminators. The system can undertake a response, such as an alarm, based on extracted event occurrences.

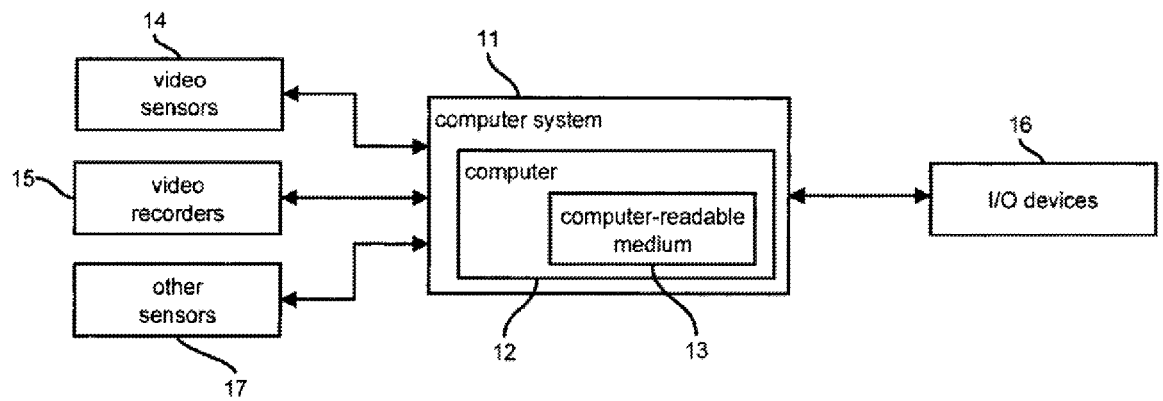

US 7,868,912 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4 and 6-22 is confirmed.

Claim 5 is cancelled.

New claims 23-36 are added and determined to be patentable.

23. *A video system comprising:*
    *a first processor which analyzes a video to determine attributes of objects detected in the video, the first processor being in communication with a first communications link to transfer the determined attributes over the communications link; and*
    *a second processor, separate from the first processor, in communication with the first communications link to receive the determined attributes transferred from the first processor over the first communications link, which determines a first event that is not one of the determined attributes by analyzing a combination of the received determined attributes and which provides, in response to a determination of the first event, at least one of an alert to a user, information for a report, and an instruction for taking an action, wherein analyzing the combination of the received determined attributes comprises filtering,*
    *wherein the first processor determines attributes independent of a selection of the first event by the second processor, and*
    *wherein the second processor determines the first event without reprocessing the video analyzed by the first processor.*

24. *A video system, comprising:*
    *an input in communication with a communications channel;*
    *a processor configured to receive from the input a stream of detected attributes received over the communications channel, the attributes being attributes of one or more objects detected in a video, the processor configured to determine an event that is not one of the detected attributes by analyzing a combination of the received attributes and configured to provide, upon a determination of the event, at least one of an alert to a user, information for a report and an instruction for taking an action, wherein analyzing the combination of the received attributes comprises filtering,*
    *wherein the attributes received over the communications channel are independent of the event to be determined by the processor, and*
    *wherein the processor is configured to determine the event without reprocessing the video.*

25. *A method of detecting an event from a video, comprising:*
    *receiving a stream of detected attributes over a communications channel, the detected attributes representing attributes of an object previously detected in the video at a remote location;*
    *performing an analysis of a combination of the detected attributes to detect an event that is not one of the detected attributes without reprocessing the video, wherein the analysis of the combination of the detected attributes comprises filtering,*
    *upon detecting the event, providing at least one of an alert to a user, information for a report and an instruction for taking an action,*
    *wherein the detected attributes received in the stream of attributes are independent of a selection of the event to be detected.*

26. *A video system comprising:*
    *a first processor which analyzes a video to determine attributes of objects detected in the video, the first processor being in communication with a first communications link to transfer the determined attributes over the communications link; and*
    *a second processor, separate from the first processor, in communication with the first communications link to receive the determined attributes transferred from the first processor over the first communications link, which determines a first event that is not one of the determined attributes by analyzing a combination of the received determined attributes and which provides, in response to a determination of the first event, at least one of an alert to a user, information for a report, and an instruction for taking an action,*
    *wherein the attributes of objects detected in the video comprise first and second objects, and the first event is the first and second objects coming together,*
    *wherein the first processor determines attributes independent of a selection of the first event by the second processor, and*
    *wherein the second processor determines the first event without reprocessing the video analyzed by the first processor.*

27. *A video system, comprising:*
    *an input in communication with a communications channel;*
    *a processor configured to receive from the input a stream of detected attributes received over the communications channel, the attributes being attributes of first and second objects detected in a video, the processor configured to determine an event that is not one of the detected attributes by analyzing a combination of the received attributes and configured to provide, upon a determination of the event, at least one of an alert to a user, information for a report and an instruction for taking an action, the event being the first and second objects coming together,*
    *wherein the attributes received over the communications channel are independent of the event to be determined by the processor, and*
    *wherein the processor is configured to determine the event without reprocessing the video.*

28. *A method of detecting an event from a video, comprising:*
    *receiving a stream of detected attributes over a communications channel, the detected attributes representing attributes of first and second objects previously detected in the video at a remote location;*
    *performing an analysis of a combination of the detected attributes to detect an event that is not one of the detected* attributes without reprocessing the video, the event being the first and second objects coming together,
upon detecting the event, providing at least one of an alert to a user, information for a report and an instruction for taking an action,
wherein the detected attributes received in the stream of attributes are independent of a selection of the event to be detected.

29. A method comprising:
analyzing a video to detect first and second objects;
creating a stream of attributes at a first location by determining attributes of the detected first object and attributes of the detected second object by analyzing the video;
transmitting the stream of attributes to a second location removed from the first location for subsequent analysis,
wherein the stream of attributes are transmitted to the second location over a communications channel, and
wherein the stream of attributes is sufficient to allow the subsequent analysis to detect an event of the video to provide at least one of an alert to a user, information for a report and an instruction for taking an action, the event not being one of the determined attributes, the event being the first and second objects coming together,
wherein the stream of attributes is sufficient to allow detection of the event that is not one of the determined attributes without reprocessing the video of the first location.

30. A video device, comprising:
a processor at a first location which analyzes a video to detect first and second objects and to determine attributes of the first object detected in the video and attributes of the second object detected in the video;
an output configured to transmit the attributes determined by the processor over a communications link,
wherein the output is configured to transmit the attributes to a second location removed from the processor for a subsequent analysis of a combination of the attributes at the second location,
wherein the processor determines attributes independently of a subsequent analysis of a combination of attributes to determine an event that is not one of the determined attributes, the event being the first and second objects coming together, and
wherein the attributes are sufficient to allow detection of an event to provide at least one of an alert to a user, information for a report and an instruction for taking an action, the event not being one of the determined attributes and being determinable by analyzing the combination of the attributes,
wherein the attributes are sufficient to allow detection of an event without reprocessing the video of the first location.

31. A video system comprising:
a first processor which analyzes a video to determine attributes of objects detected in the video, the first processor being in communication with a first communications link to transfer the determined attributes over the communications link; and
a second processor, separate from the first processor, in communication with the first communications link to receive the determined attributes transferred from the first processor over the first communications link, which determines a first event that is not one of the determined attributes by analyzing a combination of the received determined attributes and which provides, in response to a determination of the first event, at least one of an alert to a user, information for a report, and an instruction for taking an action, wherein analyzing the combination of the received determined attributes comprises filtering,
wherein the attributes of objects detected in the video comprise first and second objects, and the first event is the first and second objects coming together,
wherein the first processor determines attributes independent of a selection of the first event by the second processor, and
wherein the second processor determines the first event without reprocessing the video analyzed by the first processor.

32. A video system, comprising:
an input in communication with a communications channel;
a processor configured to receive from the input a stream of detected attributes received over the communications channel, the attributes being attributes of first and second objects detected in a video, the processor configured to determine an event that is not one of the detected attributes by analyzing a combination of the received attributes and configured to provide, upon a determination of the event, at least one of an alert to a user, information for a report and an instruction for taking an action, the event being the first and second objects coming together, wherein analyzing the combination of the received attributes comprises filtering,
wherein the attributes received over the communications channel are independent of the event to be determined by the processor, and
wherein the processor is configured to determine the event without reprocessing the video.

33. A method of detecting an event from a video, comprising:
receiving a stream of detected attributes over a communications channel, the detected attributes representing attributes of first and second objects previously detected in the video at a remote location;
performing an analysis of a combination of the detected attributes to detect an event that is not one of the detected attributes without reprocessing the video, wherein the analysis of the combination of the detected attributes comprises filtering, the event being the first and second objects coming together,
upon detecting the event, providing at least one of an alert to a user, information for a report and an instruction for taking an action,
wherein the detected attributes received in the stream of attributes are independent of a selection of the event to be detected.

34. The video system of claim 23, wherein the filtering comprises filtering the combination of the received determined attributes to determine if the first event occurred.

35. The video system of claim 24, wherein the filtering comprises filtering the combination of the received attributes to determine if the event occurred.

36. The method of claim 25, wherein the filtering comprises filtering the combination of the detected attributes to determine if the event occurred.

* * * * *